US008295381B2

(12) United States Patent
Mohammed et al.

(10) Patent No.: US 8,295,381 B2
(45) Date of Patent: Oct. 23, 2012

(54) SIGNAL DECODER WITH GENERAL PURPOSE CALCULATION ENGINE

(75) Inventors: Karim Mohammed, Los Angeles, CA (US); Babak Daneshrad, Encino, CA (US); Weijun Zhu, Los Angeles, CA (US); Hun-Seok Kim, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 973 days.

(21) Appl. No.: 12/167,062

(22) Filed: Jul. 2, 2008

(65) Prior Publication Data
US 2009/0262868 A1    Oct. 22, 2009

Related U.S. Application Data

(60) Provisional application No. 61/046,663, filed on Apr. 21, 2008.

(51) Int. Cl.
   *H04B 7/02*    (2006.01)
(52) U.S. Cl. ......... 375/267; 711/100; 370/203; 370/319
(58) Field of Classification Search .................. 375/267, 375/227, 242, 285, 295, 348; 711/100; 370/203, 370/319, 328
See application file for complete search history.

(56) References Cited

U.S. PATENT DOCUMENTS

| 7,209,515 | B2 | 4/2007 | Kilfoyle et al. | |
|---|---|---|---|---|
| 7,602,745 | B2 * | 10/2009 | Lin et al. | 370/328 |
| 7,668,268 | B2 * | 2/2010 | Heiskala | 375/348 |
| 7,693,231 | B2 * | 4/2010 | Ling et al. | 375/295 |
| 2005/0041746 | A1 * | 2/2005 | Rosen et al. | 375/242 |
| 2007/0164902 | A1 | 7/2007 | Bang et al. | |

OTHER PUBLICATIONS

Seki, Katsutoshi; Kobori, Tomoyoshi; Okello, James; Ikekawa, Masao; "A Cordic-Based Reconfigrable Systolic Array Processor for MIMO-OFDM Wireless Communications," Signal Processing Systems, 2007 IEEE Workshop on , vol., no., pp. 639-644, Oct. 17-19, 2007.*
Allen, J., "Short Term Spectral Analysis, Synthesis, and Modification by Discrete Fourier Transform," IEEE Transactions on Acoustics, Speech and Signal Processing, Jun. 1977, vol. 25, No. 3, pp. 235-238.
Andrews, "Interference Cancellation for Cellular Systems: A Contemporary Overview," IEEE Wireless Communications, Apr. 2005, vol. 12, No. 2, pp. 19-29.
Andria et al., "Windows and Interpolation Algorithms to Improve Electrical Measurement Accuracy," IEEE Transactions on Instrumentation and Measurement, Aug. 1989, vol. 38, No. 4, pp. 856-863.

(Continued)

*Primary Examiner* — David Ometz
*Assistant Examiner* — Fitwi Hailegiorgis
(74) *Attorney, Agent, or Firm* — Knobbe, Martens, Olson & Bear, LLP

(57) ABSTRACT

Some embodiments disclosed herein provide a signal decoder with a general purpose calculation engine. A system for decoding signals in a wireless communication system can include: a controller including an instruction counter; a program memory configured to store program code for operating the controller; a general purpose calculation engine configured to perform primitive operations derived from algorithms for decoding a plurality of coded signals received via a plurality of receive antennas; and a data memory connected to the general purpose calculation engine for storing data generated by the general purpose calculation engine while performing the primitive operations.

38 Claims, 8 Drawing Sheets

OTHER PUBLICATIONS

Bliss et al., "MIMO Wireless Communication Channel Phenomenology," IEEE Transactions on Antennas and Propagation, Aug. 2004, vol. 52, No. 8, pp. 2073-2082.

Bliss et al., "Multichannel Multiuser Detection of Space-Time Turbo Codes: Experimental Performance Results," Thirty-Sixth Asilomar Conference on Nov. 3-6, 2002, Signals, Systems & Computers, May 2003, vol. 2, pp. 1343-1348.

Bliss, D.W. and Forsythe, K.W., "Information Theoretic Comparison of MIMO Wireless Communication Receivers in the Presence of Interference," Conference Record of the Thirty-Eighth Asilomar Conference on Nov. 7-10, 2004, Signals, Systems and Computers, Mar. 2005, vol. 1, pp. 866-870.

Bliss, D.W., "Robust MIMO Wireless Communication in the Presence of Interference Using Ad Hoc Antenna Arrays," Military Communications Conference, Oct. 13-16, 2003, MILCOM IEEE, vol. 2, pp. 1382-1385.

Burg et al., "A 50 MBPS 4X4 Maximum Likelihood Decoder for Multiple-input Multiple-output Systems with QPSK Modulation", Proceedings of the 10th IEEE Intl. Conference on Electronics, Dec. 14-17, 2003, ICECS, 2003, Vol. Nos. 1-3, pp. 332-335.

Burg et al., "VLSI Implementation of MIMO Detection Using the Sphere Decoding Algorithm", IEEE Journal of Solid-State Circuits, Jul. 2005, vol. 40, No. 7, pp. 1566-1577.

Carlson, B.D., "Covariance Matrix Estimation Errors and Diagonal Loading in Adaptive Arrays," IEEE Transactions on Aerospace and Electronic Systems, Jul. 1988, vol. 24, No. 4, pp. 397-401.

Chiasserini and Rao, "Coexistence Mechanisms for Interference Mitigation between iIEEE 802.11 WLANs and Bluetooth," INFOCOM, Nov. 7, 2002, vol. 2, pp. 590-598.

Coulson, A.J., "Narrowband Interference in Pilot Symbol Assisted OFDM Systems," IEEE Transactions on Wireless Communications, Nov. 2004, vol. 3, No. 6, pp. 2277-2287.

Edman and Owall, "A Scalable Pipelined Complex Valued Matrix Inversion Architecture", IEEE International Symposium, May 23-25, Circuits and Systems, Jul. 2005, vol. 5, pp. 4489-4483.

Erceg et al., "TGn Channel Models," Jan. 9, 2004, IEEE 802.11 Wireless LANs, document 11-03/0940r1.

Gabriel, "Using Spectral Estimation Techniques in Adaptive Processing Antenna Systems," IEEE Transactions on Antennas and Propagation, Mar. 1986, vol. 34, No. 3, pp. 291-300.

Guo and Nilsson, "A low-complexity VLSI Architecture for Square Root MIMO Detection", Proceedings of the IASTED Intl. Conference on Circuits Signals, and Systems, May 19-21, 2003, pp. 304-309.

Guo and Nilsson, "A VLSI Architecture of the Schnorr-Euchner Decoder for MIMO Systems", IEEE 6th Circuits and Systems Symposium, May 31-Jun. 2, 2004, Emerging Technologies: Frontiers of Mobile and Wireless Communication, Aug. 2004, vol. 1, pp. 65-68.

IEEE TGn Working Group, "Joint Proposal: High Throughput Extension to the 802.11 Standard: PHY," http://www.ieee802.org/11/; Jan. 2006.

Karkooti and Cavallaro, "FPGA Implementation of Matrix Inversion Using QRD-RLD Algorithm", Conference record of the Thirty-Ninth Asilomar Conference, Oct. 28-Nov. 1, 2005, Signals, Systems and Computers, Mar. 2006, pp. 1625-1629.

Kim et al., "An efficient FPGA Based MIMO-MMSE Detector," Wireless Integrated Systems Research (WISR) Group, UCLA, 2007, pp. 1131-1135.aSE.

La Roche and Roy, "An Efficient Regular Matrix Inversion Circuit Architecture for MIMO Processing", 2006 IEEE International Symposium, ISCAS, Sep. 2006, pp. 4819-4822.

Lan Man Standards Committee, "Wireless LAN Medium Access Control (MAC) and Physical Layer (PHY) Specifications," IEEE Std 802.11-1997, The Institute of Electrical and Electronics Engineers, New York, 1997.

Le Floch et al., "Coded Orthogonal Frequency Division Multiplex," Proceedings of the IEEE, Jun. 1995, vol. 83, No. 6, pp. 982-996.

McHenry and Chunduri, "Spectrum Occupancy Measurements Location 3 of 6: National Science Foundation Building Roof", Apr. 16, 2004, Shared Spectrum Company Report, Aug. 15, 2005.

McHenry and Steadman, "Spectrum Occupancy Measurements Location 1 of 6: Riverbend Park, Great Falls, Virginia", Apr. 7, 2004, Shared Spectrum Company Report, Aug. 15, 2005.

McHenry and Steadman, "Spectrum Occupancy Measurements Location 2 of 6: Tyson's Square Center, Vienna, Virginia", Apr. 9, 2004, Shared Spectrum Company Report, Aug. 15, 2005.

McHenry and Steadman, "Spectrum Occupancy Measurements Location 5 of 6: National Radio Astronomy Observatory (NRAO), Green Bank, West Virginia", Oct. 10-11, 2004, Shared Spectrum Company Report, Aug. 15, 2005.

McHenry et al., "Spectrum Occupancy Measurements Location 4 of 6: Republican National Convention, New York City, New York", Aug. 30-Sep. 3, 2004, Shared Spectrum Company Report, Aug. 15, 2005.

McHenry et al., "Spectrum Occupancy Measurements Location 6 of 6: Shared Spectrum Building Roof, Vienna, Virginia", Dec. 15-16, 2004, Shared Spectrum Company Report, Aug. 15, 2005.

Mohammed et al., "Universal MIMO decoder for next generation wireless communication", Poster at annual research review HSSEAS, Feb. 16, 2007.

Myllyla et al., "Complexity Analysis of MMSE Detector Architectures for MIMO OFDM Systems", Thirty-Ninth Asilomar Conference, Oct. 28-Nov. 1, 2008, Signals, Systems and Computers, Mar. 2006, pp. 75-81.

Peha, "Wireless Communications and Coexistence for Smart Environments," IEEE Personal Communications, Oct. 2000, vol. 7, pp. 66-68.

Rife and Vincent, "Use of the Discrete Fourier Transform in the Measurement of Frequencies and Levels of Tones," The Bell System Technical Journal, Feb. 1970, vol. 49, No. 2, pp. 197-228.

S. Nandula and K Giridhar, "Robust Timing Synchronization for OFDM Based Wireless LAN System", Conference on Convergent Technologies for Asia-Pacific Region on Oct. 15-17, 2003, TENCON, Mar. 2003, vol. 4, pp. 1558-1561.

Schmidl and Cox, "Robust Frequency and Timing Synchronization for OFDM," IEEE Transactions on Communications, Dec. 1997, vol. 45, No. 12, pp. 1613-1621.

Steinhardt and Pulsone, "Subband STAP Processing, The Fifth Generation", Sensor Array and Multichannel Signal Processing Workshop held on Mar. 16-17, 2000, Proceedings of the 2000 IEEE, Aug. 2002, pp. 1-6.

Wang et al., "Timing Synchronization for 802.11a WLANs under Multipath Channels," Australian Telecommunications, Networks and Applications Conference, 2003.

Wang, "A Recursive Least-Squares Asic for Broadband 8 X 8 Multiple-Input Multiple-Output Wireless Communications", Nov. 2005.

Wiegandt and Nassar, "High-Throughput, High-Performance OFDM via Pseudo-Orthogonal Carrier Interferometry Coding", The 12th IEEE International Symposium on Personal Indoor and Mobile Radio Communications held Sep. 30-Oct. 3, 2001, PIMRC Proceedings, Aug. 2002, vol. 2, pp. G-98-G-102.

Wiegandt et al., "High-Throughput, High-Performance OFDM via Pseudo-Orthogonal Carrier Interferometry Spreading Codes", IEEE Transactions on Communications, Jul. 2003, vol. 51, No. 7, pp. 1123-1134.

Zhang and Dai, "Cochannel Interference Mitigation and Cooperative Processing in Downlink Multicell Multiuser MIMO Networks," EURASIP Journal on Wireless Communications and Networking, vol. 2004, No. 2, pp. 222-235.

Zhiqiang et al., "Narrowband interference Rejection in OFDM via Carrier Interferometry Spreading Codes," IEEE Transactions on Wireless Communications, Jul. 2005, vol. 4, No. 4, pp. 1491-1505.

Zhu et al., "A real time MIMO OFDM Testbed for Cognitive Radio & Networking Research," Proceedings of the 1st international Workshop on Wireless Network Testbeds, Experimental Evaluation & Characterization, WiNTECH 2006. ACM, New York, NY, pp. 115-116.

* cited by examiner

SIGNAL DECODER WITH GENERAL PURPOSE CALCULATION ENGINE

CROSS-REFERENCE TO RELATED APPLICATIONS

This application claims the benefit under 35 U.S.C. §119(e) of U.S. Provisional Application No. 61/046,663, filed Apr. 21, 2008, titled SIGNAL DECODER WITH GENERAL PURPOSE CALCULATION ENGINE, the entire contents of which are incorporated by reference herein and made a part of this specification.

BACKGROUND

1. Field

This disclosure relates generally to communication systems and, more particularly, to systems and methods for signal coding in communication systems using a general purpose calculation engine.

2. Description of Related Art

Wireless communication systems can use multiple antennas at the transmitter and multiple antennas at the receiver to achieve improved throughput over a communications link. Such systems are sometimes called multiple-input and multiple-output (MIMO) communication systems. MIMO systems can include a transmitter that processes a primitive data stream to form coded signals. In some MIMO systems, the transmitter divides the primitive data stream into data sub-streams. The data sub-streams are channel encoded, interleaved in space and time, and multiplexed onto transmit antennas to produce space-time coded signals. Each of the space-time coded signals can be transmitted over a different one of the transmit antennas.

MIMO systems typically include a receiver that has multiple receive antennas. The received signal at each of the receive antennas is a superposition of each of the transmitted signals. The receiver processes the received signals to separate out and then decode the superpositioned transmitted signals. The processing of received signals in a MIMO system is sometimes called MIMO decoding and can include interference cancellation, maximum likelihood techniques, and other types of processing.

SUMMARY

Embodiments described herein have several features, no single one of which is solely responsible for their desirable attributes. Without limiting the scope of the invention as expressed by the claims, some of the advantageous features will now be discussed.

Some embodiments provide a signal decoder with a general purpose calculation engine. A system for decoding signals in a wireless communication system can include: a controller including an instruction counter; a program memory configured to store program code for operating the controller; a computation engine configured to perform primitive operations derived from algorithms for decoding a plurality of coded signals received via a plurality of receive antennas; and a data memory connected to the computation engine for storing data generated by the computation engine while performing the primitive operations.

Certain embodiments provide an electronic device for decoding signals in a wireless communication system. The device includes a plurality of signal inputs configured to receive coded signals received by a plurality of receive antennas; a general purpose calculation engine configured to perform primitive operations derived from a first algorithm for decoding the coded signals received via the plurality of signal inputs and a second algorithm for decoding said signals; a first protocol module configured to issue instructions to the general purpose calculation engine for implementing the first algorithm for decoding the coded signals; a second protocol module configured to issue instructions to the general purpose calculation engine for implementing the second algorithm for decoding the coded signals; a data memory connected to the computation engine for storing data generated by the general purpose calculation engine while performing the primitive operations on the signals; and one or more outputs configured to output decoded information generated by the general purpose calculation engine. The electronic device is configured to decode signals in accordance with two or more wireless communication protocols by performing primitive operations using the general purpose calculation engine.

Some embodiments of the system can include an input switch matrix connected to an input of the data memory and an output switch matrix connected to an output of the data memory. The switches are designed in such a way that they reduce or minimize the footprint without sacrificing flexibility in rearranging data.

In some embodiments of the system, the input switch matrix includes: a core output connection configured to receive data from the computation engine; a memory input controller connection configured to receive selector instructions from the controller; a plurality of core output multiplexers connected to the core output connection and the memory input controller connection; a first level of multiplexers connected to the core output multiplexers and the memory input controller connection; a second level of multiplexers connected to at least some outputs of the first level of multiplexers; and a memory input connection connected to the second level of switches, the memory input connection configured to send data to the data memory. The first level of multiplexers and the second level of multiplexers are configured to multiplex at least some of the data by, first, picking a quadrant of data memory and, second, picking a block of data memory.

In some embodiments of the system, the controller further includes a matrix index counter configured to send control signals to a read address input of the data memory and a write matrix index counter configured to send control signals to a write address input of the data memory.

In additional embodiments of the system, the data memory includes: a write enable (WE) input configured to receive control signals from the controller; a write address input configured to receive control signals from a write matrix index counter; and a read address input configured to receive control signals from a matrix index counter.

In some embodiments of the system, the computation engine includes a multiplication core, a division core, a CORDIC (Coordinate Rotation Digital Computer) core, and an addition core. The CORDIC core can be configured to implement at least a subset of the primitive operations. The subset of primitive operations implemented by the CORDIC core can include complex rotation of a complex vector, diagonal rotation, and real rotation of a complex vector.

In further embodiments of the system, the computation engine includes a multiple cycle dynamic scaling circuit connected to an output of the multiplication core and to an output of the division core. The dynamic scaling circuit can have an instruction input connected to the controller. The dynamic scaling circuit can be configured to scale the outputs of the multiplication core and the division core. In some embodiments, the dynamic scaling circuit reduces or minimizes quantization error by activating the full dynamic range of a given bit precision.

In some embodiments of the system, the CORDIC core includes at least one vectoring CORDIC module and at least one rotation CORDIC module. For example, the CORDIC core can include four (4) rotation CORDIC modules. In some embodiments, each of the at least one vectoring CORDIC modules includes two (2) real vectoring CORDICs. In some embodiments, each of the at least one rotation CORDIC modules includes three (3) real CORDICs.

In some embodiments of the system, the algorithm includes at least one of square Minimum Mean Square Error (MMSE) using Givens rotations or Gram-Schmidt orthogonalization, square root MMSE using Givens rotations or Gram-Schmidt orthogonalization, Singular Value Decomposition (SVD), or Sphere Decoding (SD).

In some embodiments of the system, the primitive operations include at least one of complex vectoring, complex rotation, diagonal rotation, real vectoring, real rotation, dot product, complex addition, or scalar division.

In some embodiments of the system, the coded signals are transmitted by a plurality of transmit antennas.

Some embodiments disclosed herein provide a MIMO decoder with efficient memory addressing. For example, a system for addressing data memory in a signal decoder can include a data memory and a controller. The controller can include a read matrix instance counter configured to send read memory address information to the data memory and a write matrix instance counter configured to send write memory address information to the data memory. The matrix instance counter represents a specific matrix being processed in the pipeline; in an OFDM system, for example, the "instance" could represent the current subcarrier. The system includes a computation engine and an input switch matrix. The input switch matrix includes: a core output connection configured to receive data from the computation engine; a memory input controller connection configured to receive selector instructions from the controller; a plurality of core output multiplexers connected to the core output connection and the memory input controller connection; a first level of multiplexers connected to the core output multiplexers and the memory input controller connection; a second level of multiplexers connected to at least some outputs of the first level of multiplexers; and a memory input connection connected to the second level of switches. The memory input connection is configured to send data to the data memory. The first level of multiplexers and the second level of multiplexers are configured to select an address of the data memory by, first, picking a quadrant of data memory and, second, picking a block of data memory.

Some embodiments of the system include an output switch matrix. The output switch matrix includes: a memory output connection configured to receive data from the data memory; a memory output controller connection configured to receive selector instructions from the controller; a first level of multiplexers connected to the memory output connection and the memory output controller connection; a second level of multiplexers connected to the first level of multiplexers; and a core input connection configured to send data to the computation engine.

In some embodiments of the system, the controller includes: a matrix instance counter configured to send read memory address information to the data memory and a write matrix instance counter configured to send write memory address information to the data memory.

In some embodiments of the system, the controller includes an instruction counter connected to a program memory. The program memory is configured to send control signals to the input switch matrix, the output switch matrix, and the computation engine.

In some embodiments of the system, the data memory includes: a write enable (WE) input configured to receive control signals from the controller; a write address input configured to receive control signals from a write matrix instance counter; and a read address input configured to receive control signals from a matrix instance counter.

In some embodiments of the system, the plurality of core output multiplexers includes a plurality of three-to-one multiplexers. Each of the three-to-one multiplexers has inputs connected to a dynamic scaling circuit output, a CORDIC core output, and an addition core output.

In some embodiments of the system, the first level of multiplexers includes a first plurality of two-to-one multiplexers having inputs connected to a first half and a different second half of the core output multiplexer outputs and a second plurality of two-to-one multiplexers having two inputs connected to the first half and to the different second half of the core output multiplexer outputs.

In some embodiments of the system, the second level of multiplexers includes: a first plurality of N-to-one multiplexers and a second plurality of N-to-one multiplexers. Each of the first plurality of N-to-one multiplexers has N inputs connected to each output of the first plurality of two-to-one multiplexers in the first level of multiplexers. Each of the second plurality of N-to-one multiplexers has N inputs connected to each output of the second plurality of two-to-one multiplexers in the first level of multiplexers. In some embodiments, N is an integer not less than two (2). For example, in some embodiments, N is five (5). In such embodiments, the first plurality of two-to-one multiplexers includes five (5) multiplexers, the second plurality of two-to-one multiplexers includes five (5) multiplexers, and the plurality of core output multiplexers includes ten (10) multiplexers.

Some embodiments provide a signal decoder with dynamic scaling circuitry. A system for processing data in a signal decoder can include: a controller; a data memory connected to the controller for storing signal data during signal decoding; a computation engine configured to perform primitive operations derived from algorithms for decoding a plurality of coded signals. The computation engine includes: a multiplication core configured to process data from the data memory; a division core configured to process data from the data memory; and a dynamic scaling circuit having data inputs connected to an output of the multiplication core and to an output of the division core and having an instruction input connected to the controller. The dynamic scaling circuit is configured to scale the outputs of the multiplication core and the division core in order to reduce or minimize the quantization error by activating the full dynamic range of the given bit precision.

In some embodiments of the system, the dynamic scaling circuit is configured to scale multiplication and division results for one or for multiple cycles up to an order of a matrix being processed by the computation engine.

In some embodiments of the system, the dynamic scaling circuit includes a scaling value detection module and a scaling module.

In some embodiments of the system, an output of the scaling module is multiplexed with a statically scaled signal generated from the output of the multiplication core and the output of the division core to generate a dynamically and statically scaled output.

In some embodiments of the system, the scaling module and the scaling value calculation module include one or more data registers and/or a delay module. The one or more data registers and/or the delay module are configured to adjust the timing of the scaling value calculation module and the scaling module such that a selected scaling value is applied to the output of the multiplication core and the output of the division core at a selected time.

In some embodiments of the system, a scalable core output includes the output of the multiplication core and the output of the division core. The scaling value calculation module is configured to calculate a scaling value that depends upon a current scalable core output and potentially up to three (3) vectors from previous cycles.

Some embodiments provide a modified CORDIC calculation core. A system for implementing rotation operations in a signal decoder can include: a controller; a data memory connected to the controller for storing signal data during signal decoding; and a computation engine configured to perform primitive operations derived from algorithms for decoding a plurality of coded signals. The computation engine includes a CORDIC core. The CORDIC core is configured to implement a plurality of primitive operations. The plurality of primitive operations implemented by the CORDIC core includes complex rotation of a complex vector, diagonal rotation, and real rotation of a complex vector.

In some embodiments of the system, the computation engine further includes: a multiplication core configured to process data from the data memory; a division core configured to process data from the data memory; and a dynamic scaling circuit having data inputs connected to an output of the multiplication core and to an output of the division core and having an instruction input connected to the controller. The dynamic scaling circuit is configured to scale the outputs of the multiplication core and the division core in order to stabilize the dynamic performance of the computation engine.

In some embodiments of the system, the CORDIC core includes at least one vectoring CORDIC module and at least one rotation CORDIC module. For example, in some embodiments of the system, the CORDIC core includes four (4) rotation CORDIC modules.

In some embodiments of the system, each of the at least one vectoring CORDIC modules includes two (2) real vectoring CORDICs. In some embodiments of the system, each of the at least one vectoring CORDIC modules includes one or more multiplexers configured to reroute at least some of the inputs and outputs of the two real vectoring CORDICs to implement one or more of a plurality of unitary vectoring operations.

In some embodiments of the system, each of the at least one rotation CORDIC modules includes three (3) real CORDICs. In some embodiments of the system, each of the at least one rotation CORDIC modules includes one or more multiplexers configured to reroute at least some of the inputs and outputs of the three real CORDICs and to bypass at least some of the real CORDICs to implement one or more of a plurality of unitary rotational operations.

In some embodiments of the system, the algorithm includes at least one of Minimum Mean Square Error (MMSE) square, MMSE square root, Singular Value Decomposition (SVD), Givens Rotation, or Sphere Decoding (SD).

In some embodiments of the system, the CORDIC core is configured to process at least one row of a 4×4 matrix per cycle. In some embodiments, a "row" refers to an arrangement of up to four matrix elements. Thus, the "row" can be a row, column, diagonal, even elements, or another arrangement of any four elements from the matrix. In some embodiments, the flexibility to process multiple matrix elements in various arrangements is afforded by an efficient structure for the input switch matrix and the output switch matrix.

BRIEF DESCRIPTION OF THE DRAWINGS

The following drawings and the associated descriptions are provided to illustrate embodiments of the present disclosure and do not limit the scope of the claims.

Figure 1:
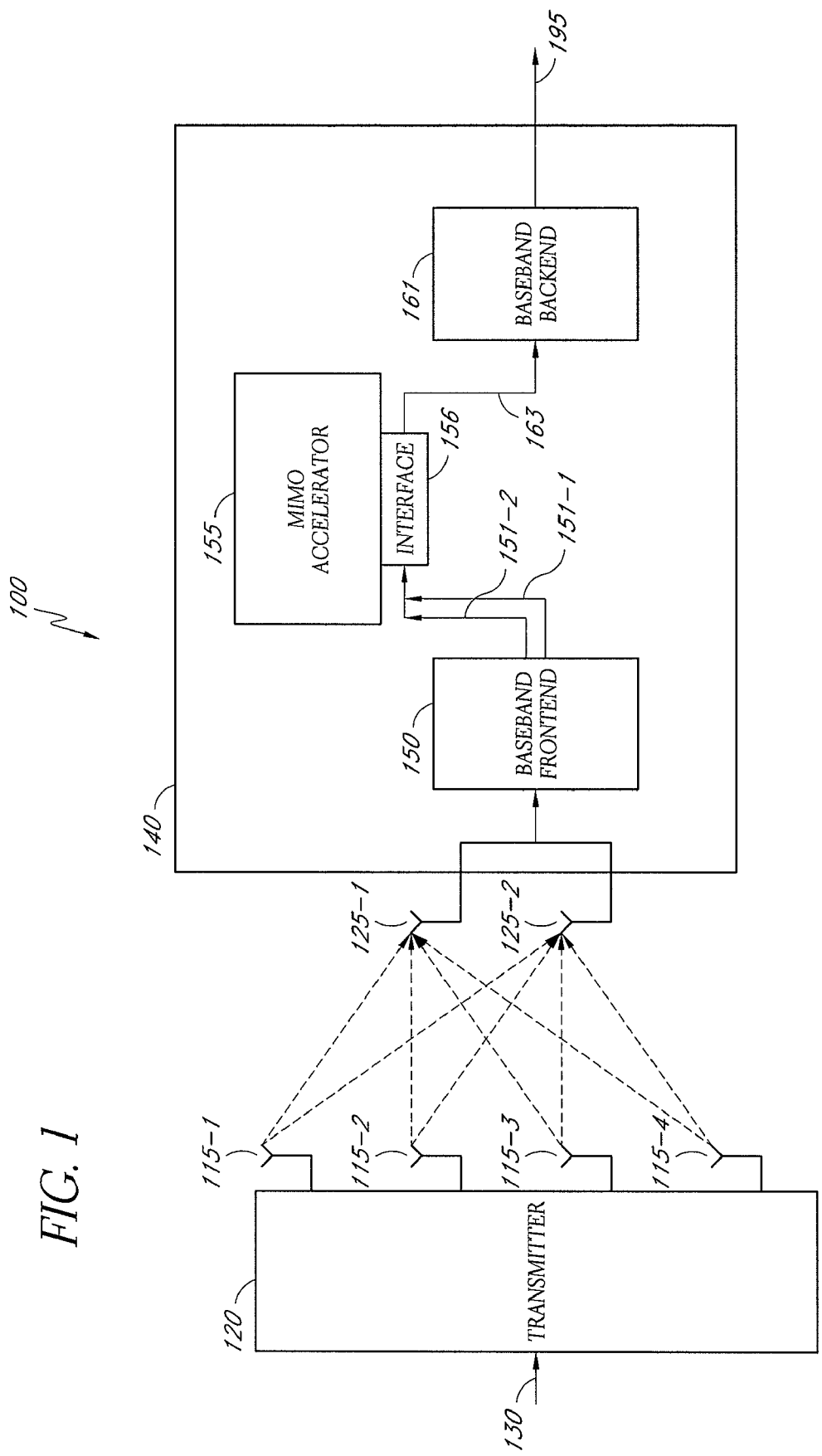
FIG. 1 is a schematic diagram of a wireless communication system in which a transmitter having multiple transmit antennas communicates with a receiver having multiple receive antennas.

The figures are not drawn to scale and illustrate the interconnectivity of the depicted systems and not necessarily their spatial layout and physical dimensions.

DETAILED DESCRIPTION OF PREFERRED EMBODIMENTS

Although certain preferred embodiments and examples are disclosed below, inventive subject matter extends beyond the specifically disclosed embodiments to other alternative embodiments and/or uses of the invention, and to modifications and equivalents thereof. Thus, the scope of the inventions herein disclosed is not limited by any of the particular embodiments described below. For example, in any method or process disclosed herein, the acts or operations of the method or process may be performed in any suitable sequence and are not necessarily limited to any particular disclosed sequence. For purposes of contrasting various embodiments with the prior art, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Wireless communication systems incorporating MIMO technology have helped to meet an increasing demand for raw bitrate in a spectrum scarce environment. Some embodiments of the system relate to MIMO in light of current trends in hardware architectures and silicon economics. Such trends may include, for example, software-defined radio (SDR), cognitive radio and multi user detection systems. Technology economics favor sacrificing silicon area for reprogramability and flexibility. These trends will underscore and/or support a shift in consumer electronics from single use appliances to versatile platforms. This will favor a shift in the design approach of complex subsystems such as MIMO decoders.

MIMO decoders can be one of the most costly parts in a receiver of a wireless communication system. For example, in a 4×4 IEEE 802.11n system, the decoder can occupy as much area as the rest of the digital baseband. MIMO decoders invert the channel through an implicit matrix inversion. Implicit matrix inversion may be done through several alternative algorithms: square Minimum Mean Square Error (MMSE), Singular Value Decomposition (SVD), Sphere Decoding (SD), BLAST, square root MMSE, or one of their many variants. When hardware complexity and baseband power dissipation are considered, no single algorithm is considered optimal for all purposes.

The selection of an algorithm can depend on channel conditions or other factors. For example, in high signal-to-noise ratio (SNR) conditions, a simple algorithm like MMSE may be optimal because it satisfies minimum quality of service (QoS) requirements while dissipating a smaller amount of receiver baseband power. In other conditions, a high performance algorithm such as a near maximum likelihood (ML) SD algorithm may help to maintain QoS above the lowest acceptable level. Some MIMO systems are designed with decoders that deliver acceptable QoS under many varieties of rigorous channel conditions.

One decoder design paradigm is optimization for the worst case scenario channel conditions. Such a design paradigm can be satisfactory under certain conditions, such as when a communications link does not require high bandwidth. A shift in the design paradigm may be necessary when the impact of emerging technologies and market pressures are considered. For example, some devices combine WiFi (for example, IEEE 802.11-based technology) and cellular wireless communication services into one handset. Other devices may also include additional communications functionality, such as WiMAX (for example, IEEE 802.16-based technology) and/or other communications technologies. Integration of multiple communications technologies into a single device may create demand for receivers that can operate across standards and support standards with multiple modes, such as, for example, WiMAX.

In some embodiments, a single integrated circuit can decode multiple types of MIMO signals. A MIMO signal-decoding circuit is sometimes called, for example, a universal accelerator, a MIMO block, a MIMO accelerator, a signal decoder, a MIMO decoder, or a MIMO engine. In an example embodiment, a single MIMO engine can be configured to switch between decoding of WiFi, WiMAX, and UMTS signals. In certain embodiments, the single MIMO engine is able to decode MIMO signals of two or more types substantially simultaneously. For example, the MIMO engine can be configured to switch rapidly between modes of decoding for two or more types of transmission.

Cognitive radio, in which transmission or reception parameters are altered in response to active monitoring of the radio environment, is another trend that reinforces the need for multiple modes of operation.

Improved silicon scaling technologies has caused the cost of digital gates to become progressively lower. On the other hand, the design cost of integrated circuits has risen due to increased complexity. For these and other reasons, a designer may choose to create a circuit with embedded macros and accelerators rather than with datapath-oriented designs.

The trends described above contribute to a need for MIMO decoders that can scale the number of antennas, scale in signal bandwidth, switch between standards, change algorithms, and trade speed for power in real time. A decoder created with a datapath-oriented design for this purpose would likely be very expensive.

In some embodiments, a MIMO decoder is provided that has a substantially reduced design cost. The MIMO decoder may also be referred to as, for example, a MIMO accelerator, a universal decoder, or a universal accelerator. The MIMO decoder has a generic, optimized core architecture of processing units that perform functions common to most or all decoding algorithms. The sequence in which the processing units are used is defined by a compiled program. The program drives a general purpose controller that traffics data to and from memory.

Algorithms for MIMO decoding include MMSE decoding and its variants, such as, for example, the square root MMSE algorithm. MMSE performs reasonably well under nominal signal-to-noise ratio (SNR) conditions. MMSE decoding is considered to be of manageable complexity, and some variants or modifications of MMSE decoding exhibit excellent fixed point performance.

MIMO decoders include processing units for performing, for example, interference cancellation, MMSE, zero-forcing (ZF), BLAST, and other algorithms. Decoders can employ systolic arrays or derivatives to implement a unitary transformation of a channel matrix, putting data into a more manageable form before completing the decoding. Systolic arrays are scalable, regular arrangements of data processing units, and their problems and properties are well studied. One such problem is with downscaling, which involves sacrificing performance for area in an array of a certain size. The performance penalty from downscaling has been handled by introducing time sharing and by collapsing a triangular array of data processing units into a linear array. These techniques can reduce the regularity and simple control inherent to the architecture.

Some decoders abandon the generic array and, instead, employ a more "hand tailored" circuit having a complex arithmetic datapath. This design can lead to very high performance-cost metrics that make even complex algorithms like sphere decoding (SD) and maximum likelihood (ML) viable. One limitation of such circuits in the case of SD is that they ignore the pre-processing stage of the algorithm, which still needs a unitary transformation of the matrix before carrying out the search.

In some embodiments, a MIMO accelerator includes a set of common primitive operations (for example, common factors) representative of most or all MIMO decoding algorithms. In some embodiments, the algorithms that the accelerator can perform include square Minimum Mean Square Error (MMSE) using Givens rotations or Gram-Schmidt orthogonalization, square root MMSE using Givens rotations or Gram-Schmidt orthogonalization, Singular Value Decomposition (SVD), and Sphere Decoding (SD). Using only a common primitive set, a MIMO accelerator can implement most or all decoding algorithms and their probable derivatives and modifications.

Signal decoding algorithms often use a class of operations sometimes called Givens rotations. Givens rotations and trigonometric functions can often be calculated using an iterative algorithm such as the CORDIC (Coordinate Rotation Digital Computer) algorithm. As an algorithm, CORDIC calculates trigonometric functions by a series of successively more accurate calculations. These calculations involve multiplication and accumulation. The multiplications are all by powers of 2, so in hardware a CORDIC typically includes a set of adders and shifters. In effect, a CORDIC performs trigonometric calculations, including multiplying by trigonometric functions, without using multipliers. In some embodiments, a MIMO accelerator is configured to perform three broad classes of Givens rotations:

1. Complex (two angle) rotation of a complex vector. This appears in QR decomposition (part of MMSE, SD, and BLAST) and also appears in one step of Jacobi (used for SVD).

$$\begin{bmatrix} \cos\theta & e^{j\phi}\sin\theta \\ -e^{-j\phi}\sin\theta & \cos\theta \end{bmatrix} \begin{bmatrix} A_r + jA_i \\ B_r + jB_i \end{bmatrix} = \begin{bmatrix} A_{or} + jA_{oi} \\ 0 \end{bmatrix}$$

2. Diagonal rotations. They appear in both QR decomposition and Jacobi.

$$\begin{bmatrix} e^{j\beta/2} & 0 \\ 0 & e^{-j\beta/2} \end{bmatrix} \begin{bmatrix} A_r + jA_i \\ B_r + jB_i \end{bmatrix} = \begin{bmatrix} A_{or} \\ B_{or} + jB_{oi} \end{bmatrix}$$

3. Real (single angle) rotation of complex vectors. This appears in Jacobi but may also be used in special cases of QR decomposition.

$$\begin{bmatrix} \cos\theta & \sin\theta \\ -\sin\theta & \cos\theta \end{bmatrix} \begin{bmatrix} A_r + jA_i \\ B_r + jB_i \end{bmatrix} = \begin{bmatrix} A_{or} + jA_{oi} \\ B_{or} + jB_{oi} \end{bmatrix}$$

Orthogonalization and orthonormalization techniques are commonly used in signal decoding. One technique for performing orthogonalization is known as the Gram-Schmidt process. The Gram-Schmidt process transforms a set of vectors into a set of orthogonal vectors by projecting them onto each other and subtracting the non-orthogonal component. This process is sometimes used to perform QR decomposition as an alternative to using Givens rotations. In some embodiments, a signal decoder implements a QR decomposition (for example, MMSE) using either Givens rotations or Gram-Schmidt orthogonalization.

Matrix multiplications are also a common factor of most or all algorithms. Matrix-matrix multiplication appears in the decoding stage of square MMSE, square root MMSE, and SVD. It also appears in the pre-processing stage of square MMSE. Matrix-vector multiplication appears in decoding in all algorithms and in predistortion for SVD. Division also appears in most or all decoding algorithms. Division may be optional, as in the final scaling of decoded estimates for square root MMSE, or it may be compulsory, as in backsubstitution for square MMSE.

Table 1 shows a list of selected algorithms and the primitive operations (or primitives) associated with each of the algorithms.

TABLE 1

| Algorithm | Primitives |
| --- | --- |
| Square MMSE using Givens rotations | Complex vectoring Complex rotation Dot product Scalar division Complex matrix addition |
| Square root MMSE using Givens rotations | Complex vectoring Complex rotation Dot product Scalar division |
| Square MMSE using Gram-Schmidt orthogonalization | Dot product Complex vectoring Scalar division Complex vector subtraction |

TABLE 1-continued

| Algorithm | Primitives |
| --- | --- |
| Square root MMSE using Gram-Schmidt orthogonalization | Complex matrix addition Dot product Complex vectoring Scalar division Complex vector subtraction |
| SVD | Complex vectoring Complex rotation Diagonal rotation |
| SVD (cont.) | Real vectoring Real rotation Dot product |
| SD | Complex vectoring Complex rotation Complex vector addition/subtraction Dot product Scalar division |

An example Gram-Schmidt process includes projection, magnitude calculation, normalization, and non-orthogonal residue subtraction. Primitive operations used in Gram-Schmidt orthonormalization include dot product, vectoring CORDIC, scalar division, and vector subtraction.

FIG. 1 schematically illustrates a wireless communication system in which a transmitter having multiple transmit antennas communicates with a receiver having multiple receive antennas according to some embodiments. A transmitter 120 of a MIMO wireless communication system 100 processes a data stream 130 (for example, the data stream to be transmitted) using one or more encoding techniques to form coded signals. Particularly, the transmitter 120 divides the primitive data stream into data sub-streams. The data sub-streams are channel encoded, interleaved in space and time, and multiplexed onto the transmit antennas to produce the coded signals. Typically, each of the coded signals is transmitted over a different one of the transmit antennas 115-1, 115-2, 115-3, and 115-4.

The signals emanating from the transmit antennas arrive at receive antennas 125-1 and 125-2. The received signal at each of the receive antennas is typically a superposition of each of the transmitted signals. Though the transmitted signals interfere with each other, received signals are processed in a receiver 140 to separate out and then decode these superpositioned signals.

In the embodiment shown in FIG. 1, the received signal is processed in the baseband front end 150, the MIMO accelerator 155, and the Baseband backend 161. The front end 150 processes a number of received streams (for example, the streams received at receive antennas 125-1, 125-2). The front end 150 synchronizes the streams and, in some embodiments, transforms the streams into frequency domain streams 151-1, 151-2. The front end 150 can perform other suitable processing of the streams in preparation for decoding, as appropriate. The frequency domain streams 151-1, 151-2 are fed into a MIMO accelerator 155 through an accelerator interface module 156. The accelerator 155 separates the received streams into an approximation of a subset of the transmit streams transmitted by transmit antennas 115-1, 115-2, 115-3, 115-4. The accelerator 155 can also further process the data so that the output 163, in some embodiments, is a raw set of spatially demultiplexed streams. In alternative embodiments, the output 163 includes metrics for soft decoding or hard decision bits. The output 163 is fed to a baseband backend 161 through the interface 156. The backend 161 performs remaining receiver functions to produce a stream of payload bits at 195.

In some embodiments, a block of the soft value bits can be processed in the MIMO accelerator 155, which can perform one of many MIMO decoding algorithms based on instructions specified by a program. At the output 163 of the MIMO accelerator 155, the values of the soft value bits are their values as decoded by the MIMO accelerator 155. The resulting bits can be further processed in the baseband backend 161, such as by, for example, decoding them, to obtain a reconstructed primitive data stream 195.

Figure 8:
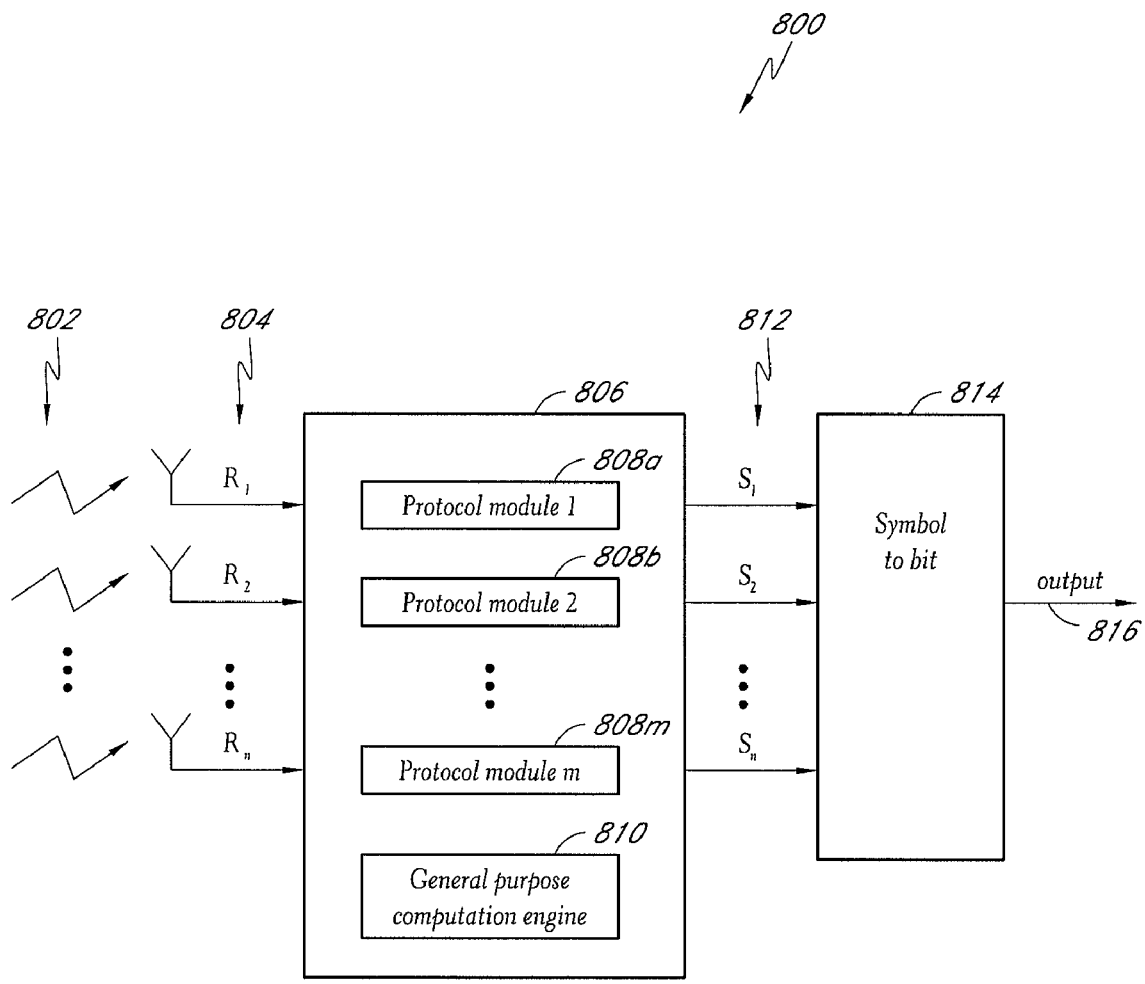
FIG. 8 is a block diagram showing certain components of a MIMO receiver with a general MIMO decoding block.

FIG. 8 shows a block diagram showing certain components of a MIMO receiver 800 employing a general MIMO decoding block 806. The general MIMO decoding block 806 can include, for example, at least a portion of the MIMO accelerator 155 shown in FIG. 1. Not all components of the receiver 800 are shown in FIG. 8. For example, one or more circuits to decode certain types of coded signals (such as, for example, superpositioned space-time coded signals), channel de-interleaver, channel interleaver, channel estimator, signal-to-noise estimator, noise variance calculator, and/or other suitable components can be incorporated into the MIMO receiver 800.

The receiver 800 shown in FIG. 8 is configured to receive a plurality of coded signals 802. For example, the receiver 800 can include a plurality of antennas 804 to receive the signals 802. In some embodiments, the number of antennas 804 with which the receiver 800 can be used is scalable. For example, the MIMO decoding block 806 can be configured to receive coded signals from a selectable number of antennas 804. In some embodiments, the MIMO decoding block 806 is configured to decode signals received at two or more antennas, four or more antennas, sixteen or more antennas, between one and sixteen antennas, or any number n of antennas. In some embodiments, a manufacturer, a programmer, or a user of the decoder can configure the decoding block 806 to decode signals received at a selected number of antennas 804. In some embodiments, the MIMO decoding block 806 is able to detect the number of antennas 804 from which it receives encoded signals and adjust the operation of the decoding block 806 as necessary to suitably decode signals originating from the number of antennas 804 detected.

In some embodiments, the MIMO decoding block 806 is scalable in the MIMO decoding algorithm used to decode the signals 802. The MIMO decoding block 806 shown in FIG. 8 includes a plurality of protocol modules 808a-808m. For example, the decoding block 806 can include two or more protocol modules 808, more than two modules 808, or any other suitable number m of protocol modules 808. A protocol module 808 issues encoded instructions for decoding MIMO signals according to a communications protocol. For example, the decoding block 806 can include one protocol module 808 for each decoding algorithm that the receiver 800 is configured to perform. As another example, the decoding block 806 can include one protocol module 808 for each communication protocol that the receiver 800 is configured to implement. As a further example, the decoding block 806 can include a protocol module 808 that issues instructions for performing multiple decode algorithms used in a wireless communication protocol. Preferably, the decoding block 806 is configured to implement two or more wireless communication protocols and/or decoding algorithms.

The protocol modules 808 issue instructions for operating a general purpose calculation engine 810. In some embodiments, the general purpose calculation engine 810 includes several dedicated blocks (sometimes called, for example, "cores," computation units, or calculation units) for performing certain types of operations, such as, for example, Givens rotations, dot products, division, addition, primitive operations, and/or other operations. The general purpose calculation engine 810 is designed to perform several different MIMO decoding algorithms, such as, for example, algorithms used in industry standard communication protocols, such as IEEE 802.11-based, IEEE 802.16-based, UMTS, GSM, CDMA, W-CDMA, or other protocols.

In some embodiments, the MIMO decoding block 806 is scalable in the bandwidth of the signal being processed. For example, the clock frequency or the number of computation units used by the computation engine 810 can be adjusted as necessary such that adequate computing resources are allocated to performing signal decoding. In some embodiments, the MIMO decoding block 806 can scale to a lower bandwidth in exchange for a more complex decoding algorithm or to support more antennas. Also, the decoding block 806 can be configured to scale to a higher bandwidth when a simpler decoding algorithm or fewer antennas are used.

After decoding the signals 802, the decoder block 806 outputs a plurality of symbol streams 812 that are passed to a symbol to bit converter 814. The symbol to bit converter 814 converts the symbol streams to an output stream 816, such as a stream of binary bits.

In some embodiments, the number of antennas, the bandwidth of the signal, and the decoding algorithm is independent of the modulation scheme and the communication protocol (for example, WiFi, WiMAX, UMTS, GMS, a cellular transmission protocol, and/or a wireless data transmission protocol) for which the decoding algorithm is used. A communications device or system incorporating a general purpose calculation engine 810 need not include a unique MIMO decoder block 806 for each transmission protocol implemented by the wireless communication system. For example, a communications handset, such as a mobile phone, with a general MIMO decoder block 806 that implements WiFi, WiMAX, and a voice transmission protocol (for example, GSM, CDMA, W-CDMA, or a cellular protocol) need not include three separate decoder blocks.

Figure 2:
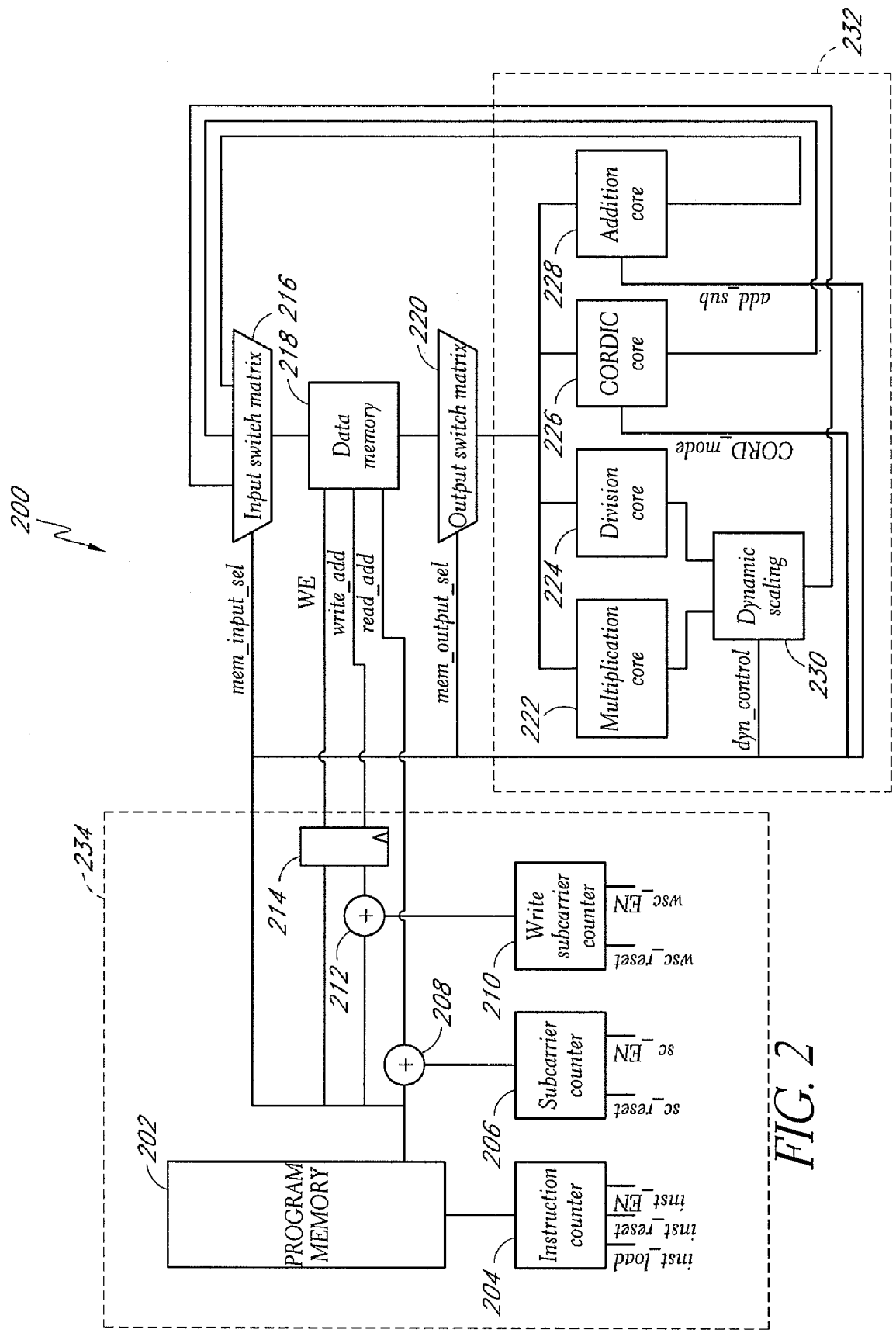
FIG. 2 is a schematic architectural overview of a universal decoder for use in a receiver having multiple receive antennas.

FIG. 2 shows a schematic diagram of an architecture 200 of a MIMO accelerator, such as, for example, the MIMO accelerator 155 shown in FIG. 1. The architecture 200 can be used to decode streams received by a receiver with multiple receive antennas. The architecture 200 is sometimes called a signal decoder architecture or a MIMO decoding block architecture. The architecture 200 separates the primitive operations isolated, for example, from the algorithms shown in Table 1, from control and arranges them in a generic but optimized fashion. Matrices are held in a data memory 218 whose outputs feed multiple cores, including, for example, a multiplication core 222, a division core 224, a CORDIC core 226, and an addition core 228, in a massively parallel fashion. The outputs of the cores 222, 224, 226, and 228 are re-routed back to the data memory 218. In the embodiment shown in FIG. 2, scaling of the outputs of the multiplication core 222 and the division core 224 is handled by a multiple cycle dynamic scaling circuit 230.

In some embodiments, both reading from and writing to the data memory 218 are routed through an output switch matrix 220 and an input switch matrix 216, respectively. The switch matrices can reduce the footprint of the switch fabric during data transfers to and from the data memory 218. The operation of the accelerator is managed by a controller 234 that can include, for example, an instruction counter 204, a matrix instance counter 206, a write matrix instance counter 208, and/or logical operators, such as the addition operators 208, 212 shown in FIG. 2, and one or more instruction and/or data registers, such as the data register 214 shown. The controller 234 is driven by program code stored in a program memory 202 that is separate from the data memory 218.

In the embodiment shown in FIG. 2, the CORDIC core 226 implements rotation operations, such as, for example, the three Givens rotation operations described previously. One type of CORDIC core that can be used to implement the rotation operations is sometimes called a super CORDIC. A super CORDIC is a CORDIC capable of handling complex numbers, under the condition that the leading element in the vector is real. A vectoring (translation) super CORDIC consists of two real vectoring CORDICs. For rotation, the super CORDIC consists of three real CORDICs. However, an unmodified super CORDIC can support only the first mode of Givens rotation.

Figure 3:
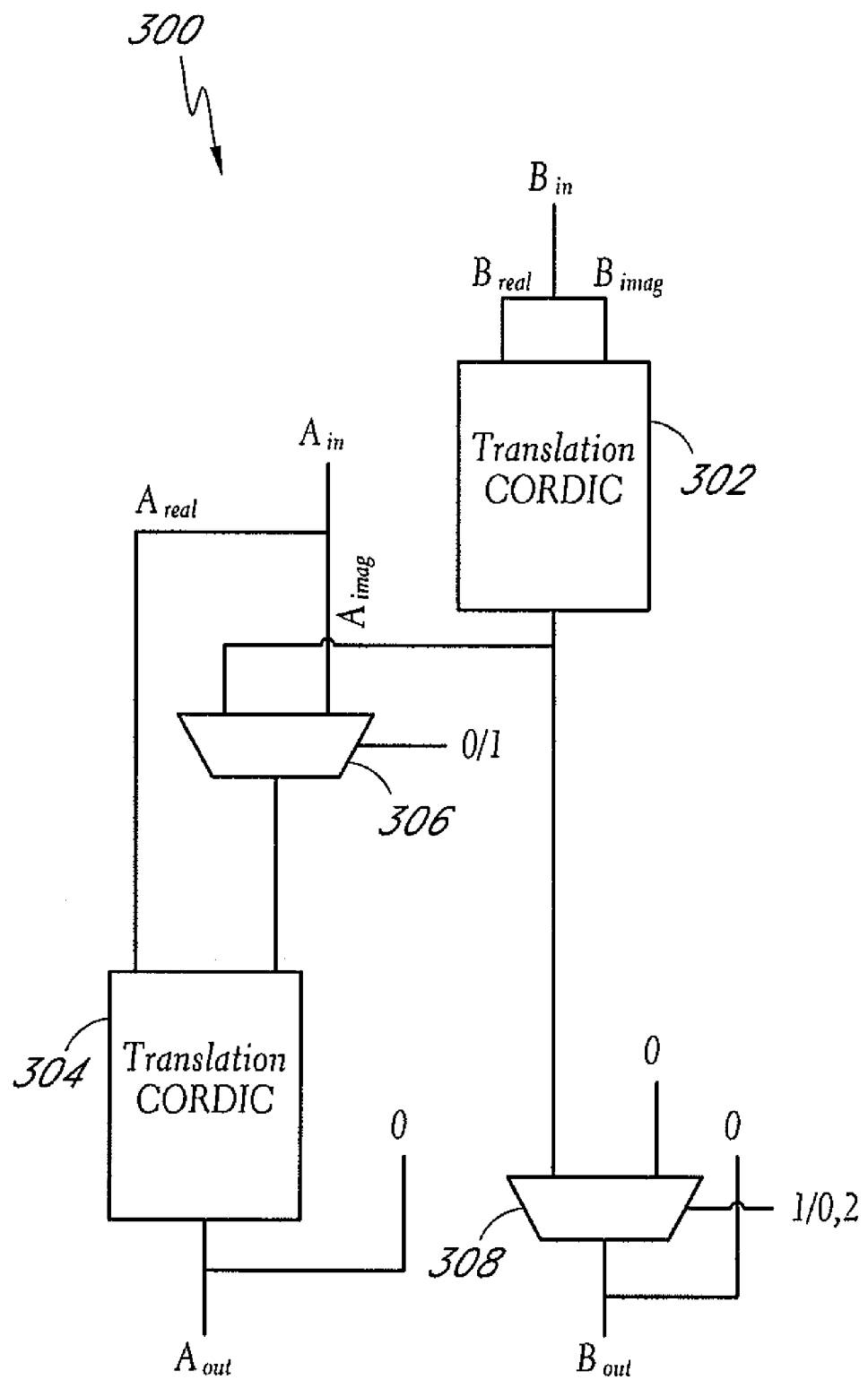
FIG. 3 is a diagram of a circuit in a CORDIC core for performing translations.
Figure 4:
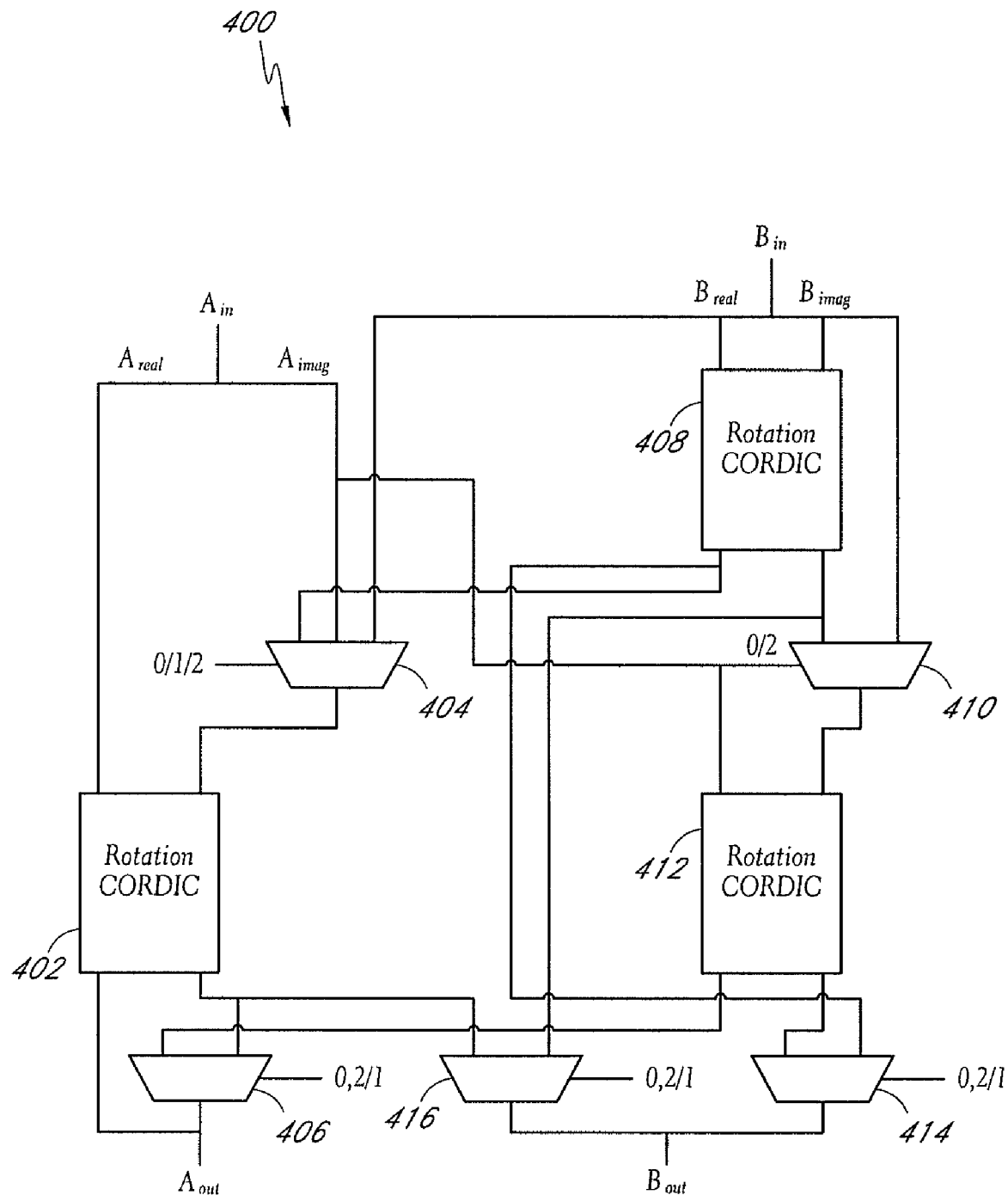
FIG. 4 is a diagram of a circuit in a CORDIC core for performing rotations.

FIGS. 3 and 4 show modifications of the super CORDIC that allow the CORDIC core 226 to support all three modes of rotation. In FIG. 3, a modified translation super CORDIC 300 (for example, a translation CORDIC module or a vectoring CORDIC module) includes a first multiplexer 304 and a second multiplexer 308 that reroute inputs and outputs and bypass real translation CORDICs to implement single angle translation. A first translation CORDIC 302 (for example, a vectoring CORDIC) accepts a first vector B. The output of the first CORDIC 302 is passed to an input of each of the multiplexers 304 and 308. The imaginary component of a second vector A is also passed to an input of the first multiplexer 304. The real component of the second vector A and the output of the first multiplexer are passed to a second translation CORDIC 306.

As shown in FIG. 4, a modified rotation super CORDIC 400 (for example, a rotation CORDIC module) can include multiplexers 404, 406, 412, 414, and 416 that reroute inputs and outputs to bypass real rotation CORDICs 402, 408, and 410 (for example, real CORDICs) to implement single angle rotation.

In some embodiments, the CORDIC core 226 (FIG. 2) includes one vectoring super CORDIC and four rotation super CORDICs. This can allow one row of a 4×4 matrix to be processed per cycle. In some embodiments, the relation of the "row" to stored data is defined by the program. In other words, a four-element "row" can be a column, diagonal, or an arbitrary arrangement of four complex number elements of a matrix.

A system for implementing rotation operations in a signal decoder architecture 200 can include a controller 234, a data memory 218 connected to the controller 234 for storing signal data during signal decoding, and a computation engine 232 configured to perform primitive operations derived from algorithms for decoding a plurality of coded signals. The computation engine 232 can include a CORDIC core 226. The CORDIC core 226 is configured to implement a plurality of primitive operations. The plurality of primitive operations implemented by the CORDIC core 226 can include complex rotation of a complex vector, diagonal rotation, and real rotation of a complex vector.

In some embodiments, the computation engine 232 includes a multiplication core 222 configured to process data from the data memory 218. A division core 224 is also configured to process data from the data memory 218. A dynamic scaling circuit 230 can have data inputs connected to an output of the multiplication core 222 and to an output of the division core 224. The scaling circuit 230 can also have an instruction input connected to the controller 234. The dynamic scaling circuit 230 scales the outputs of the multiplication core 222 and the division core 224 in order to activate the full dynamic range of the computation engine 232.

In some embodiments, the CORDIC core 226 includes at least one vectoring CORDIC module 300 (FIG. 3) and at least one rotation CORDIC module 400 (FIG. 4). For example, in some embodiments, the CORDIC core 226 includes four (4) rotation CORDIC modules 400.

In some embodiments, a vectoring CORDIC module 300 includes two (2) real vectoring CORDICs 302, 304. In some embodiments, each of the at least one vectoring CORDIC modules 300 includes multiplexers 306, 308 configured to reroute at least some of the inputs and outputs of the two real vectoring CORDICs 302, 304 to implement one of a plurality of unitary vectoring operations.

In some embodiments, a rotation CORDIC module 400 includes three (3) real CORDICs 402, 408, 412. In some embodiments, the rotation CORDIC module 400 includes multiplexers 404, 406, 410, 414, 416 configured to reroute the inputs and outputs of the three real CORDICs 402, 408, 412 and to bypass at least some of the real CORDICs 402, 408, 412 to implement one of a plurality of unitary vectoring operations.

Figure 5:
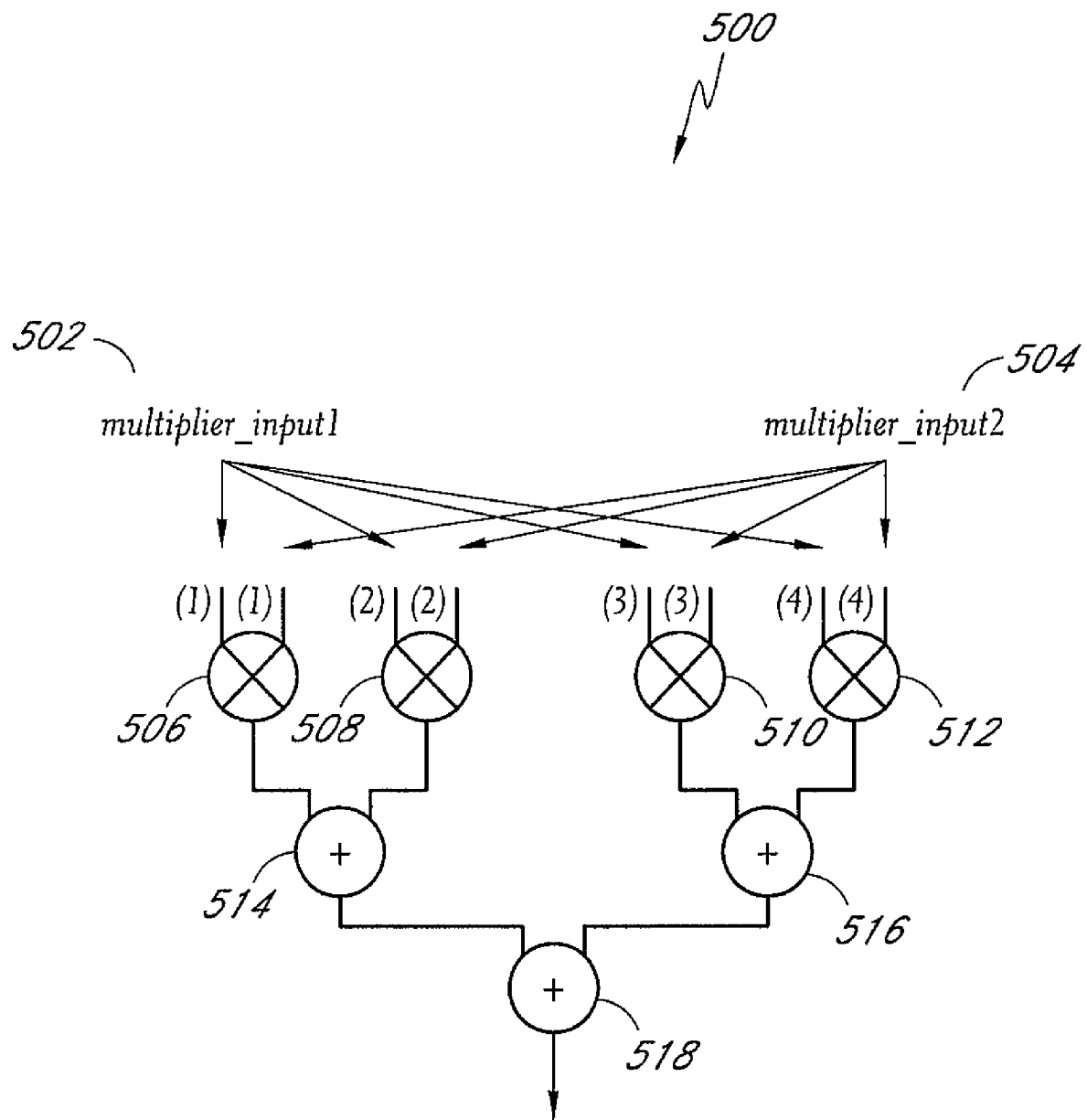
FIG. 5 is a diagram of a circuit for computing dot products for use in a multiplication core.

FIG. 5 is a diagram of a dot product unit 500 for use in the multiplier core 222. The elements of two multiplier inputs 502 and 504 are each passed to respective multiplication operators 506, 508, 510, and 512 to determine the products of the respective elements from each input. The products are then summed by a set of adders 514, 516, and 518. In some embodiments, the multiplier core 222 includes four dot product units.

In some embodiments, the division core 224 contains four real dividers with wide outputs. In some embodiments, the addition core 228 is a simple set of sixteen complex adders.

Figure 6:
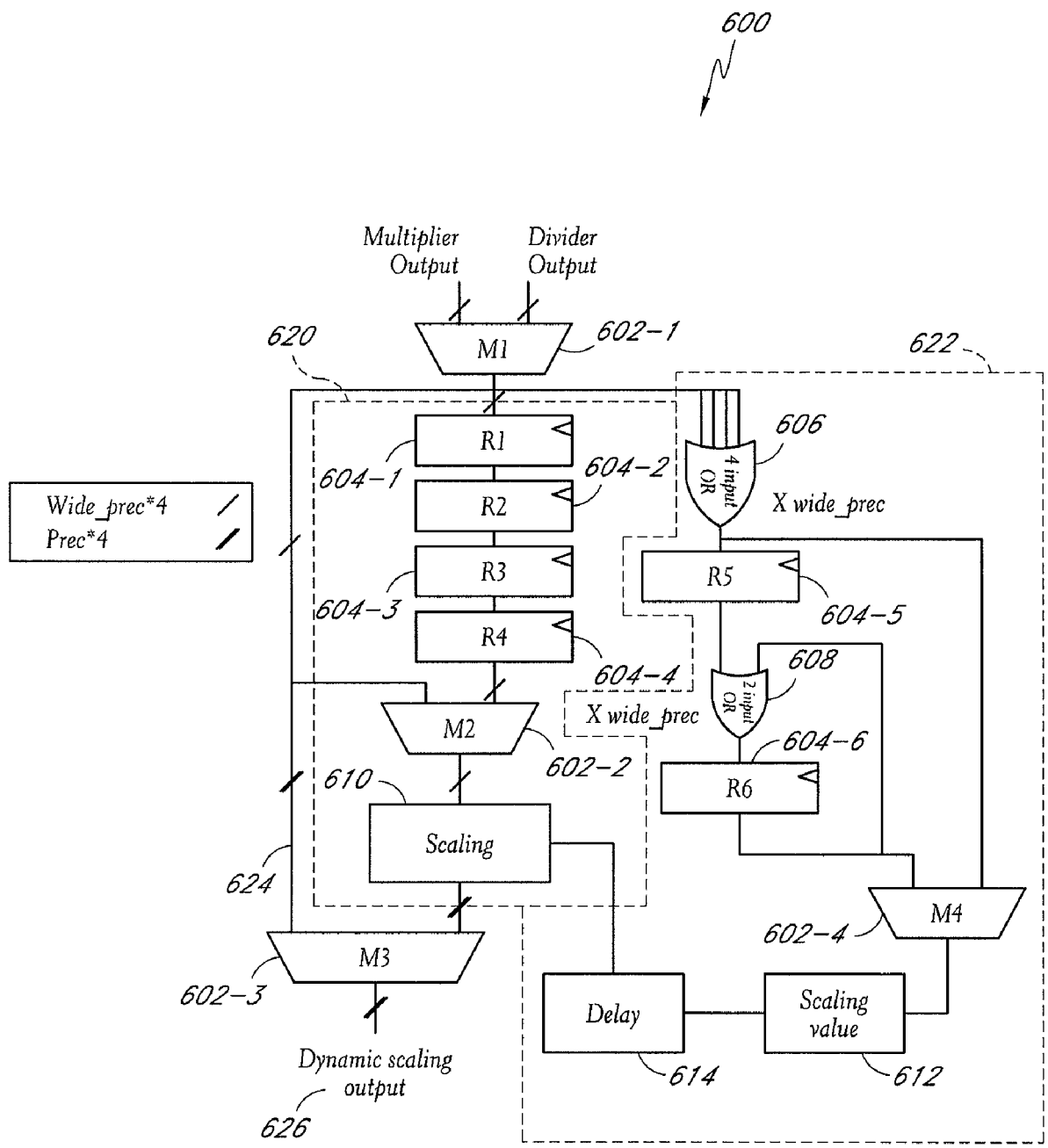
FIG. 6 is a diagram of a circuit for performing multiple cycle dynamic scaling.

FIG. 6 shows a multiple cycle dynamic scaling circuit 600. The scaling circuit 600 can be used to minimize the performance loss caused by quantization error of the MIMO accelerator 155 and decrease the precision disparity between algorithms. In some embodiments, the precision disparity is decreased to within 2 bits. Multiplication and division can produce outputs which require wider dynamic range than that required by CORDIC and addition operations. Truncating multiplication and division outputs without scaling can cause overflow or excessive quantization error, which can degrade overall performance of the MIMO accelerator 155. The circuit 600 can scale multiplication and division results. The circuit 600 can scale for one or for multiple cycles, up to the order of the matrix being processed.

In some embodiments, a signal decoder has dynamic scaling circuitry. For example, a system for processing data in a signal decoder can include a controller 234 (FIG. 2), a data memory 218 connected to the controller 234 for storing signal data during signal decoding, and a computation engine 232 configured to perform primitive operations derived from algorithms for decoding a plurality of coded signals. In some embodiments, the computation engine 232 includes a multiplication core 222 configured to process data from the data memory 218, a division core 224 configured to process data from the data memory 218, and a dynamic scaling circuit 230 having data inputs connected to an output of the multiplication core 222 and to an output of the division core 224 and having an instruction input connected to the controller 234. The dynamic scaling circuit 230 can be configured to scale the outputs of the multiplication core 222 and the division core 224 in order to stabilize the dynamic performance of the computation engine 232.

In some embodiments, the dynamic scaling circuit 230 is configured to scale multiplication and division results for one or for multiple cycles up to an order of a matrix being processed by the computation engine 232.

In some embodiments of the system, the dynamic scaling circuit includes a scaling value calculation portion 622 and a scaling portion 620.

In some embodiments, a signal that results from scaling 610 is multiplexed with a statically scaled signal 624 generated from the output of the multiplication core 222 and the output of the division core 224 to generate a scaled output 626.

In some embodiments, the scaling portion 620 and the scaling value calculation portion 622 include one or more data registers 604 and/or a delay circuit 614. The one or more data registers 604 and/or the delay circuit 614 can be configured to adjust the timing of the scaling value calculation portion 622 and the scaling portion 620 such that a selected scaling value 612 is applied to the output of the multiplication core 222 and the output of the division core 224 at a selected time.

In some embodiments, a scalable core output includes the output of the multiplication core and the output of the division core. The scaling value calculation portion 622 is configured to calculate a scaling value that depends upon a current scalable core output and upon at least one previous scalable core output from a previous clock cycle.

The data memory 218 can be divided so that a single matrix element (for example, all matrix instances of such matrix element) is stored in one two-port block RAM. In one example design test, the switch circuit between memory and core elements and back again to memory was found (by synthesis) to occupy 150% the area of the rest of the circuit (for example, 24 kslices). This switching overhead may introduce a penalty relative to optimized decoders that could make the universal decoder architecture uncompetitive. The data memory 218 is divided so that there is a write port per matrix element. This configuration allows increased data access throughput by allowing matrix elements to be written in parallel. Parallel access to the data can allow better utilization of the processing capability of the computation cores 222, 224, 226, and 228.

Figures 7A, 7B:
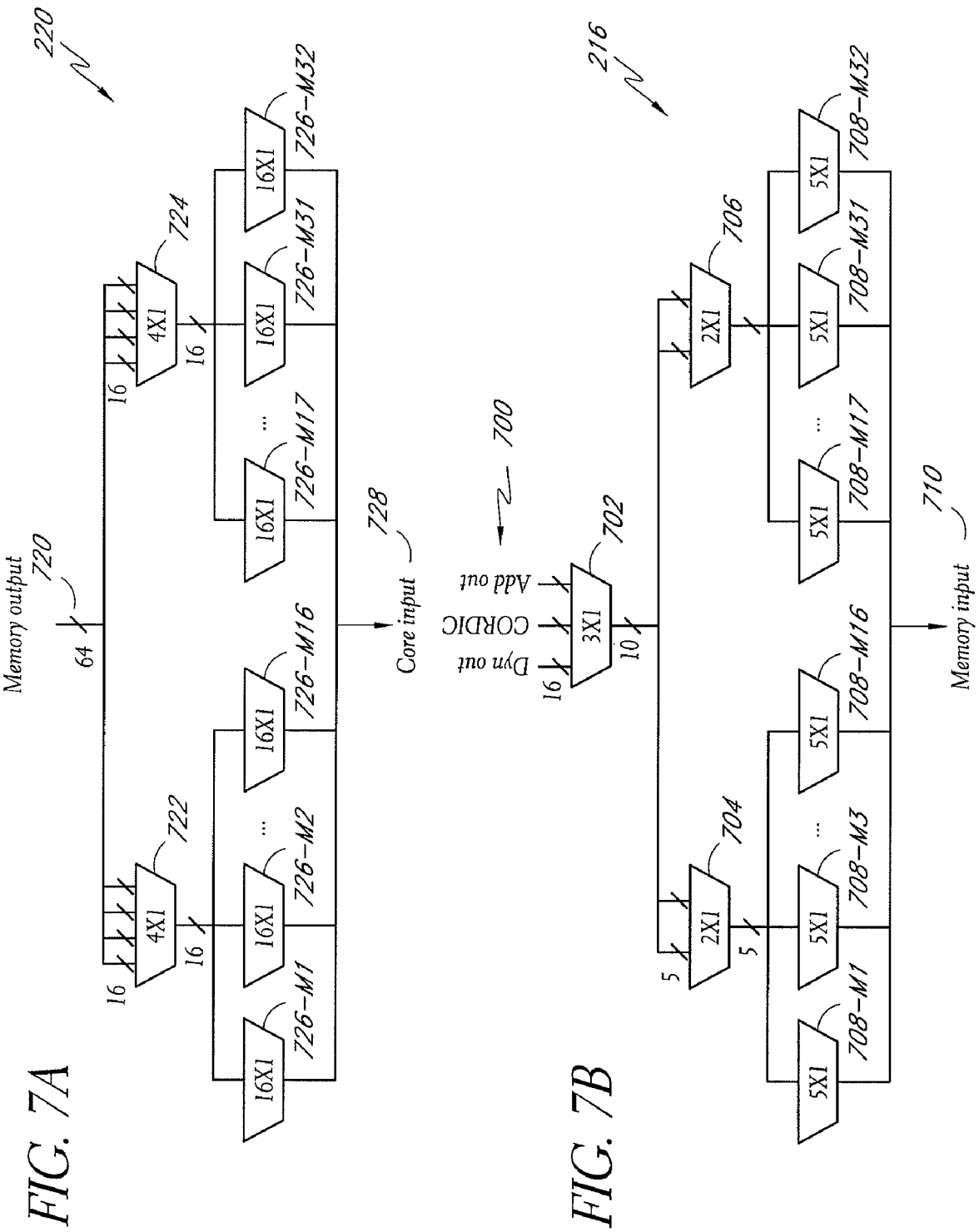
FIG. 7A is a diagram of a circuit for implementing a multiple level output switch matrix.
FIG. 7B is a diagram of a circuit for implementing a multiple level input switch matrix.

In some embodiments, two level multiplexing can be used to reduce the memory footprint of the switch circuit. Two level multiplexing can use the matrix nature of the operands to pick a quadrant of data memory first, before picking a particular block RAM. This can reduce the area of the switch fabric to one-fourth of the original area. FIGS. 7A and 7B show diagrams of circuits for implementing a multiple level switch matrix. FIG. 7A shows an embodiment of an output switch matrix 220, and FIG. 7B shows an embodiment of an input switch matrix 216 that can be used in connection with the architecture 200 shown in FIG. 2.

The multiple level switch matrix can be used to make the memory addressing of the signal decoder more efficient. For example, a system for addressing data memory in a signal decoder can include a data memory 218 (FIG. 2) and a controller 234. The controller 234 can include a matrix instance counter 206 configured to send read memory address information to the data memory 218 and a write matrix instance counter 210 configured to send write memory address information to the data memory 218. The system can include a computation engine 232 and an input switch matrix 216.

In some embodiments, the input switch matrix 216 includes a core output connection 700 (FIG. 7B) configured to receive data from the computation engine 232. A memory input controller 234 connection (not shown in FIG. 7B) can be configured to receive selector instructions from the controller 234. A plurality of core output multiplexers 702 are connected to the computation core output connection 700. A first level of multiplexers 704, 706 is connected to the core output multiplexers 702. A second level of multiplexers 708 is connected to at least some outputs of the first level of multiplexers 704, 706. The first level of multiplexers 704, 706 and the second level of multiplexers 708 are configured to select an address of the data memory by, first, picking a quadrant of data memory and, second, picking a block of data memory. The second level of multiplexers 708 sends data to the data memory 218 via a memory input 710.

Some embodiments include an output switch matrix 220. The output switch matrix 220 can include a memory output connection 720 (FIG. 7A) configured to receive data from the data memory 218. A memory output controller 234 connection can be configured to receive selector instructions from the controller 234. A first level of multiplexers 722, 724 is connected to the memory output connection 720 and the memory output controller 234 connection (not shown in FIG. 7A). A second level of multiplexers 726 is connected to the first level of multiplexers. A core input connection 728 is configured to send data to the computation engine 232.

In some embodiments, the decoder architecture 200 includes a matrix instance counter 206 configured to send read memory address information to the data memory 218 and a write matrix instance counter 210 configured to send write memory address information to the data memory 218.

In some embodiments, the decoder architecture 200 includes an instruction counter 204 connected to a program memory 202. The program memory 202 can be configured to send control signals to the input switch matrix 216, the output switch matrix 220, and the computation engine 232.

In some embodiments, the data memory 218 includes a write enable (WE) input configured to receive control signals from the controller 234, a write address input configured to receive control signals from a write matrix instance counter 210, and a read address input configured to receive control signals from a matrix instance counter 206.

In some embodiments, the core output multiplexers 702 are three-to-one multiplexers. In some embodiments, each of the three-to-one multiplexers has inputs connected to a dynamic scaling circuit 230 output, a CORDIC core 226 output, and an addition core 228 output.

In some embodiments, the first level of multiplexers 704, 706 includes two-to-one multiplexers having a first input connected to half of the core output multiplexer 702 outputs and a second input connected to the other half of the core output multiplexer 702 outputs. In the embodiment shown in FIG. 7B, the two-to-one multiplexers in the first level are divided into a first group 704 and a second group 706.

In some embodiments, the second level of multiplexers 708 includes two groups of N-to-one multiplexers. Each of the first group of N-to-one multiplexers 708-M1 through 708-M16 has N inputs connected to each output of the first group of two-to-one multiplexers 704 in the first level of multiplexers. Each of the second group of N-to-one multiplexers 708-M17 through 708-M32 has N inputs connected to each output of the second group of two-to-one multiplexers 706 in the first level of multiplexers. In some embodiments, N is an integer not less than two (2). For example, in some embodiments, N is five (5). In such embodiments, the two to one level of multiplexers includes two (2) multiplexers 704, 706. The second and final level 708 of 5×1 multiplexers is formed of 32 multiplexers divided into two groups, where each multiplexer is connected to one of the two 2×1 multiplexers 704, 706 as shown in FIG. 7B.

It is recognized that the term "module" may include software that is independently executable or standalone. A module can also include program code that is not independently executable. For example, a module may form at least a portion of an application program, at least a portion of a linked library, at least a portion of a software component, or at least a portion of a software service. Thus, a module may not be standalone but may depend on external program code or data in the course of typical operation. Additionally, a module can include instructions that are embodied in circuits or otherwise implemented by computer hardware.

The diagrams presented in the illustrative embodiments represent conceptual views of illustrative circuitry embodying the principles of the invention. Any of the functionality of the illustrative circuitry can be implemented as either a single circuit or as multiple circuits. The functionality of multiple illustrative circuitry can also be implemented as a single circuit. Additionally, one or more of the functionalities of the circuitry represented by the diagrams may be implemented in software by one skilled in the art with access to the above descriptions of such functionality.

Furthermore, although in the illustrative embodiments, elements are shown as being directly connected to each other, the elements are coupled to each other and additional elements may be coupled between the illustrated elements. As used herein, when elements are referred to herein as being connected to each other, or are shown as coupled to each other, then other elements may be interposed between them, unless it is specifically stated that two elements are directly connected to each other and that another element may not be connected between them.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, while the invention has been described with reference to various embodiments, it will be understood by those skilled in the art having reference to the specification and drawings that various modifications and alternatives are possible therein without departing from the spirit and scope of the invention as defined by the claims and their equivalents.

What is claimed is:

1. An electronic device for decoding signals in a MIMO communication system comprising:
    a plurality of signal inputs configured to receive coded signals;
    a general purpose calculation engine configured to perform primitive operations derived from algorithms for decoding the coded signals received by the plurality of signal inputs;
    a first protocol module configured to issue instructions to the general purpose calculation engine for implementing a first algorithm for decoding the coded signals;
    a second protocol module configured to issue instructions to the general purpose calculation engine for implementing a second algorithm for decoding the coded signals;
    a data memory connected to the general purpose calculation engine for storing data generated by the general purpose calculation engine while performing the primitive operations on the signals; and
    one or more outputs configured to output decoded information generated by the general purpose calculation engine;
    wherein the electronic device is configured to decode signals in accordance with two or more communication protocols by performing primitive operations using the general purpose calculation engine;
    wherein the coded signals are received via a plurality of receive antennas; and
    wherein the electronic device is configured to scale a rate at which the coded signals are decoded based on at least one of a level of complexity of a decoding algorithm or a number of receive antennas used to receive the coded signals.

2. The system of claim 1, wherein the first protocol module implements a data transmission protocol.

3. The system of claim 2, wherein the second protocol module implements a wireless voice transmission protocol.

4. The system of claim 2, wherein the second protocol module implements a GSM-based communication protocol.

5. The system of claim 1, further comprising:
    an input switch matrix connected to an input of the data memory;
    an output switch matrix connected to an output of the data memory;
    wherein the input switch matrix and the output switch matrix reduce the footprint of switch fabric used to accomplish data transfers to and from the data memory.

6. The system of claim 5, wherein the input switch matrix comprises:
    a core output connection configured to receive data from the general purpose calculation engine;
    a memory input controller connection configured to receive selector instructions from a controller;
    a plurality of core output multiplexers connected to the core output connection and the memory input controller connection;
    a first level of multiplexers connected to the core output multiplexers and the memory input controller connection;
    a second level of multiplexers connected to at least some outputs of the first level of multiplexers, the first level of multiplexers and the second level of multiplexers being configured to multiplex at least some of the data by, first, picking a quadrant of data memory and, second, picking a block of data memory; and
    a memory input connection connected to the second level of switches, the memory input connection configured to send data to the data memory.

7. The system of claim 1, further comprising a controller, wherein the controller comprises:
    a matrix instance counter configured to send control signals to a read address input of the data memory; and
    a write matrix instance counter configured to send control signals to a write address input of the data memory.

8. The system of claim 1, wherein the data memory comprises:
    a write enable (WE) input configured to receive control signals from a controller;
    a write address input configured to receive control signals from a write matrix instance counter; and
    a read address input configured to receive control signals from a matrix instance counter.

9. The system of claim 1, wherein the general purpose calculation engine comprises a multiplication core, a division core, a CORDIC core, and an addition core.

10. The system of claim 9, wherein the CORDIC core is configured to implement at least a subset of the primitive operations, and wherein the subset of primitive operations implemented by the CORDIC core comprises complex rotation of a complex vector, diagonal rotation, and real rotation of a complex vector.

11. The system of claim 9, wherein the CORDIC core comprises at least one vectoring CORDIC module and at least one rotation CORDIC module.

12. The system of claim 1, wherein the algorithm comprises at least one of square Minimum Mean Square Error (MMSE) using Givens rotations or Gram-Schmidt orthogonalization, square root MMSE using Givens rotations or Gram-Schmidt orthogonalization, Singular Value Decomposition (SVD), or Sphere Decoding (SD).

13. The system of claim 1, wherein the primitive operations comprise at least one of complex vectoring, complex rotation, diagonal rotation, real vectoring, real rotation, dot product, complex addition, or scalar division.

14. The system of claim 1, wherein the received coded signals are transmitted by a transmitter having a plurality of transmit antennas.

15. An electronic device for decoding signals in a MIMO communication system comprising:
- a plurality of signal inputs configured to receive coded signals;
- a general purpose calculation engine configured to perform primitive operations derived from algorithms for decoding the coded signals received by the plurality of signal inputs;
- a first protocol module configured to issue instructions to the general purpose calculation engine for implementing a first algorithm for decoding the coded signals;
- a second protocol module configured to issue instructions to the general purpose calculation engine for implementing a second algorithm for decoding the coded signals;
- a data memory connected to the general purpose calculation engine for storing data generated by the general purpose calculation engine while performing the primitive operations on the signals; and
- one or more outputs configured to output decoded information generated by the general purpose calculation engine;
- wherein the electronic device is configured to decode signals in accordance with two or more communication protocols by performing primitive operations using the general purpose calculation engine; wherein the general purpose calculation engine comprises a multiplication core, a division core, a CORDIC core, and an addition core; and
- wherein the general purpose calculation engine further comprises a multiple cycle dynamic scaling circuit connected to an output of the multiplication core and to an output of the division core.

16. The system of claim 15, wherein the dynamic scaling circuit has an instruction input connected to a controller, and wherein the dynamic scaling circuit is configured to scale the outputs of the multiplication core and the division core in order to stabilize the dynamic performance of the general purpose calculation engine.

17. An electronic device for decoding signals in a MIMO communication system comprising:
- a plurality of signal inputs configured to receive coded signals;
- a general purpose calculation engine configured to perform primitive operations derived from algorithms for decoding the coded signals received by the plurality of signal inputs;
- a first protocol module configured to issue instructions to the general purpose calculation engine for implementing a first algorithm for decoding the coded signals;
- a second protocol module configured to issue instructions to the general purpose calculation engine for implementing a second algorithm for decoding the coded signals;
- a data memory connected to the general purpose calculation engine for storing data generated by the general purpose calculation engine while performing the primitive operations on the signals; and
- one or more outputs configured to output decoded information generated by the general purpose calculation engine;
- wherein the electronic device is configured to decode signals in accordance with two or more communication protocols by performing primitive operations using the general purpose calculation engine;
- wherein the coded signals are received via a plurality of receive antennas;
- wherein the general purpose calculation engine comprises a multiplication core, a division core, a CORDIC core, and an addition core;
- wherein the CORDIC core comprises at least one vectoring CORDIC module and at least one rotation CORDIC module; and
- wherein the CORDIC core comprises four (4) rotation CORDIC modules.

18. An electronic device for decoding signals in a MIMO communication system comprising:
- a plurality of signal inputs configured to receive coded signals;
- a general purpose calculation engine configured to perform primitive operations derived from algorithms for decoding the coded signals received by the plurality of signal inputs;
- a first protocol module configured to issue instructions to the general purpose calculation engine for implementing a first algorithm for decoding the coded signals;
- a second protocol module configured to issue instructions to the general purpose calculation engine for implementing a second algorithm for decoding the coded signals;
- a data memory connected to the general purpose calculation engine for storing data generated by the general purpose calculation engine while performing the primitive operations on the signals; and
- one or more outputs configured to output decoded information generated by the general purpose calculation engine;
- wherein the electronic device is configured to decode signals in accordance with two or more communication protocols by performing primitive operations using the general purpose calculation engine;
- wherein the general purpose calculation engine comprises a multiplication core, a division core, a CORDIC core, and an addition core;
- wherein the CORDIC core comprises at least one vectoring CORDIC module and at least one rotation CORDIC module; and
- wherein each of the at least one vectoring CORDIC modules comprises two (2) real vectoring CORDICs.

19. An electronic device for decoding signals in a MIMO communication system comprising:
- a plurality of signal inputs configured to receive coded signals;
- a general purpose calculation engine configured to perform primitive operations derived from algorithms for decoding the coded signals received by the plurality of signal inputs;
- a first protocol module configured to issue instructions to the general purpose calculation engine for implementing a first algorithm for decoding the coded signals;
- a second protocol module configured to issue instructions to the general purpose calculation engine for implementing a second algorithm for decoding the coded signals;

a data memory connected to the general purpose calculation engine for storing data generated by the general purpose calculation engine while performing the primitive operations on the signals; and one or more outputs configured to output decoded information generated by the general purpose calculation engine;

wherein the electronic device is configured to decode signals in accordance with two or more communication protocols by performing primitive operations using the general purpose calculation engine;

wherein the general purpose calculation engine comprises a multiplication core, a division core, a CORDIC core, and an addition core;

wherein the CORDIC core comprises at least one vectoring CORDIC module and at least one rotation CORDIC module; and wherein each of the at least one rotation CORDIC modules comprises three (3) real CORDICs.

20. A system for implementing rotation operations in a signal decoder comprising:

a controller;

a general purpose calculation engine configured to perform primitive operations derived from algorithms for decoding a plurality of coded signals, the general purpose calculation engine comprising a CORDIC core;

a first protocol module configured to issue instructions to the general purpose calculation engine for implementing a first algorithm for decoding the coded signals;

a second protocol module configured to issue instructions to the general purpose calculation engine for implementing a second algorithm for decoding the coded signals; and a data memory connected to the controller for storing signal data during signal decoding; and wherein the CORDIC core is configured to implement a plurality of primitive operations;

wherein the plurality of primitive operations implemented by the CORDIC core comprise complex rotation of a complex vector, diagonal rotation, and real rotation of a complex vector;

wherein the signal decoder is configured to decode signals in accordance with two or more communication protocols by performing primitive operations using the general purpose calculation engine; and wherein the general purpose calculation engine further comprises:
a multiplication core configured to process data from the data memory;
a division core configured to process data from the data memory; and
a dynamic scaling circuit having data inputs connected to an output of the multiplication core and to an output of the division core and having an instruction input connected to the controller, the dynamic scaling circuit being configured to scale the outputs of the multiplication core and the division core in order to stabilize the dynamic performance of the general purpose calculation engine.

21. The system of claim 20, wherein the plurality of coded signals are received via a plurality of receive antennas.

22. The system of claim 20, wherein the CORDIC core comprises at least one vectoring CORDIC module and at least one rotation CORDIC module.

23. The system of claim 20, wherein the algorithm comprises at least one of square Minimum Mean Square Error (MMSE) using Givens rotations or Gram-Schmidt orthogonalization, square root MMSE using Givens rotations or Gram-Schmidt orthogonalization, Singular Value Decomposition (SVD), or Sphere Decoding (SD).

24. The system of claim 20, wherein the general purpose calculation engine further comprises a multiplication core, a division core, and an addition core.

25. The system of claim 20, wherein the primitive operations comprise at least one of complex vectoring, complex rotation, diagonal rotation, real vectoring, real rotation, dot product, complex addition, or scalar division.

26. The system of claim 20, wherein the plurality of coded signals are transmitted by a plurality of transmit antennas.

27. A system for implementing rotation operations in a signal decoder comprising:

a controller;

a general purpose calculation engine configured to perform primitive operations derived from algorithms for decoding a plurality of coded signals, the general purpose calculation engine comprising a CORDIC core;

a first protocol module configured to issue instructions to the general purpose calculation engine for implementing a first algorithm for decoding the coded signals;

a second protocol module configured to issue instructions to the general purpose calculation engine for implementing a second algorithm for decoding the coded signals; and a data memory connected to the controller for storing signal data during signal decoding;

wherein the CORDIC core is configured to implement a plurality of primitive operations;

wherein the plurality of primitive operations implemented by the CORDIC core comprise complex rotation of a complex vector, diagonal rotation, and real rotation of a complex vector;

wherein the signal decoder is configured to decode signals in accordance with two or more communication protocols by performing primitive operations using the general purpose calculation engine;

wherein the CORDIC core comprises at least one vectoring CORDIC module and at least one rotation CORDIC module; and wherein the CORDIC core comprises four (4) rotation CORDIC modules.

28. A system for implementing rotation operations in a signal decoder comprising:

a controller;

a general purpose calculation engine configured to perform primitive operations derived from algorithms for decoding a plurality of coded signals, the general purpose calculation engine comprising a CORDIC core;

a first protocol module configured to issue instructions to the general purpose calculation engine for implementing a first algorithm for decoding the coded signals;

a second protocol module configured to issue instructions to the general purpose calculation engine for implementing a second algorithm for decoding the coded signals; and a data memory connected to the controller for storing signal data during signal decoding;

wherein the CORDIC core is configured to implement a plurality of primitive operations;

wherein the plurality of primitive operations implemented by the CORDIC core comprise complex rotation of a complex vector, diagonal rotation, and real rotation of a complex vector;

wherein the signal decoder is configured to decode signals in accordance with two or more communication protocols by performing primitive operations using the general purpose calculation engine;
wherein the CORDIC core comprises at least one vectoring CORDIC module and at least one rotation CORDIC module; and
wherein each of the at least one vectoring CORDIC modules comprises two (2) real vectoring CORDICs.

29. The system of claim 28, wherein each of the at least one vectoring CORDIC modules comprises one or more multiplexers configured to reroute at least some of the inputs and outputs of the two real vectoring CORDICs to implement single angle.

30. A system for implementing rotation operations in a signal decoder comprising:
a controller;
a general purpose calculation engine configured to perform primitive operations derived from algorithms for decoding a plurality of coded signals, the general purpose calculation engine comprising a CORDIC core;
a first protocol module configured to issue instructions to the general purpose calculation engine for implementing a first algorithm for decoding the coded signals;
a second protocol module configured to issue instructions to the general purpose calculation engine for implementing a second algorithm for decoding the coded signals; and
a data memory connected to the controller for storing signal data during signal decoding;
wherein the CORDIC core is configured to implement a plurality of primitive operations;
wherein the plurality of primitive operations implemented by the CORDIC core comprise complex rotation of a complex vector, diagonal rotation, and real rotation of a complex vector;
wherein the signal decoder is configured to decode signals in accordance with two or more communication protocols by performing primitive operations using the general purpose calculation engine;
wherein the CORDIC core comprises at least one vectoring CORDIC module and at least one rotation CORDIC module; and
wherein each of the at least one rotation CORDIC modules comprises three (3) real CORDICs.

31. The system of claim 30, wherein each of the at least one rotation CORDIC modules comprises one or more multiplexers configured to reroute at least some of the inputs and outputs of the three real CORDICs and to bypass at least some of the real CORDICs to implement single angle rotation.

32. A system for implementing rotation operations in a signal decoder comprising:
a controller;
a general purpose calculation engine configured to perform primitive operations derived from algorithms for decoding a plurality of coded signals, the general purpose calculation engine comprising a CORDIC core;
a first protocol module configured to issue instructions to the general purpose calculation engine for implementing a first algorithm for decoding the coded signals;
a second protocol module configured to issue instructions to the general purpose calculation engine for implementing a second algorithm for decoding the coded signals; and
a data memory connected to the controller for storing signal data during signal decoding;
wherein the CORDIC core is configured to implement a plurality of primitive operations;
wherein the plurality of primitive operations implemented by the CORDIC core comprise complex rotation of a complex vector, diagonal rotation, and real rotation of a complex vector;
wherein the signal decoder is configured to decode signals in accordance with two or more communication protocols by performing primitive operations using the general purpose calculation engine; and
wherein the CORDIC core is configured to process at least one row of a 4×4 matrix per cycle.

33. A system for implementing rotation operations in a signal decoder comprising:
a controller;
a general purpose calculation engine configured to perform primitive operations derived from algorithms for decoding a plurality of coded signals, the general purpose calculation engine comprising a CORDIC core;
a first protocol module configured to issue instructions to the general purpose calculation engine for implementing a first algorithm for decoding the coded signals;
a second protocol module configured to issue instructions to the general purpose calculation engine for implementing a second algorithm for decoding the coded signals;
a data memory connected to the controller for storing signal data during signal decoding;
an input switch matrix connected to an input of the data memory; and
an output switch matrix connected to an output of the data memory;
wherein the input switch matrix and the output switch matrix reduce the footprint of switch fabric used to accomplish data transfers to and from the data memory;
wherein the CORDIC core is configured to implement a plurality of primitive operations;
wherein the plurality of primitive operations implemented by the CORDIC core comprise complex rotation of a complex vector, diagonal rotation, and real rotation of a complex vector; and
wherein the signal decoder is configured to decode signals in accordance with two or more communication protocols by performing primitive operations using the general purpose calculation engine.

34. The system of claim 33, wherein the input switch matrix comprises:
a core output connection configured to receive data from the general purpose calculation engine;
a memory input controller connection configured to receive selector instructions from the controller;
a plurality of core output multiplexers connected to the core output connection and the memory input controller connection;
a first level of multiplexers connected to the core output multiplexers and the memory input controller connection;
a second level of multiplexers connected to at least some outputs of the first level of multiplexers, the first level of multiplexers and the second level of multiplexers being configured to multiplex at least some of the data by, first, picking a quadrant of data memory and, second, picking a block of data memory; and
a memory input connection connected to the second level of switches, the memory input connection configured to send data to the data memory.

35. A system for implementing rotation operations in a signal decoder comprising:
a controller;

a general purpose calculation engine configured to perform primitive operations derived from algorithms for decoding a plurality of coded signals, the general purpose calculation engine comprising a CORDIC core;

a first protocol module configured to issue instructions to the general purpose calculation engine for implementing a first algorithm for decoding the coded signals;

a second protocol module configured to issue instructions to the general purpose calculation engine for implementing a second algorithm for decoding the coded signals; and a data memory connected to the controller for storing signal data during signal decoding;

wherein the CORDIC core is configured to implement a plurality of primitive operations;

wherein the plurality of primitive operations implemented by the CORDIC core comprise complex rotation of a complex vector, diagonal rotation, and real rotation of a complex vector;

wherein the signal decoder is configured to decode signals in accordance with two or more communication protocols by performing primitive operations using the general purpose calculation engine; and wherein the controller comprises:
a matrix instance counter configured to send control signals to a read address input of the data memory; and
a write matrix instance counter configured to send control signals to a write address input of the data memory.

36. A system for implementing rotation operations in a signal decoder comprising:

a controller;

a general purpose calculation engine configured to perform primitive operations derived from algorithms for decoding a plurality of coded signals, the general purpose calculation engine comprising a CORDIC core;

a first protocol module configured to issue instructions to the general purpose calculation engine for implementing a first algorithm for decoding the coded signals;

a second protocol module configured to issue instructions to the general purpose calculation engine for implementing a second algorithm for decoding the coded signals; and a data memory connected to the controller for storing signal data during signal decoding;

wherein the CORDIC core is configured to implement a plurality of primitive operations;

wherein the plurality of primitive operations implemented by the CORDIC core comprise complex rotation of a complex vector, diagonal rotation, and real rotation of a complex vector;

wherein the signal decoder is configured to decode signals in accordance with two or more communication protocols by performing primitive operations using the general purpose calculation engine; and wherein the data memory comprises:
a write enable (WE) input configured to receive control signals from the controller;
a write address input configured to receive control signals from a write matrix instance counter; and
a read address input configured to receive control signals from a matrix instance counter.

37. A system for implementing rotation operations in a signal decoder comprising:

a controller;

a general purpose calculation engine configured to perform primitive operations derived from algorithms for decoding a plurality of coded signals, the general purpose calculation engine comprising a CORDIC core;

a first protocol module configured to issue instructions to the general purpose calculation engine for implementing a first algorithm for decoding the coded signals;

a second protocol module configured to issue instructions to the general purpose calculation engine for implementing a second algorithm for decoding the coded signals; and a data memory connected to the controller for storing signal data during signal decoding;

wherein the CORDIC core is configured to implement a plurality of primitive operations;

wherein the plurality of primitive operations implemented by the CORDIC core comprise complex rotation of a complex vector, diagonal rotation, and real rotation of a complex vector;

wherein the signal decoder is configured to decode signals in accordance with two or more communication protocols by performing primitive operations using the general purpose calculation engine;

wherein the general purpose calculation engine further comprises a multiplication core, a division core, and an addition core; and wherein the general purpose calculation engine further comprises a multiple cycle dynamic scaling circuit connected to an output of the multiplication core and to an output of the division core.

38. The system of claim 37, wherein the dynamic scaling circuit comprises an instruction input connected to the controller, and wherein the dynamic scaling circuit is configured to scale the outputs of the multiplication core and the division core in order to stabilize the dynamic performance of the general purpose calculation engine.

* * * * *

UNITED STATES PATENT AND TRADEMARK OFFICE
CERTIFICATE OF CORRECTION

| | | |
|---|---|---|
| PATENT NO. | : 8,295,381 B2 | |
| APPLICATION NO. | : 12/167062 | |
| DATED | : October 23, 2012 | |
| INVENTOR(S) | : Mohammed et al. | |

It is certified that error appears in the above-identified patent and that said Letters Patent is hereby corrected as shown below:

On the Title Page

In column 2 (page 1 item 56) at line 7, Under Other Publications, change "Reconfigrable" to --Reconfigurable--.

In column 1 (page 2 item 56) at line 29, Under Other Publications, change "iIEEE" to --IEEE--.

In the Specification

In column 10 at line 46, Change "front end" to --frontend--.

In column 10 at line 47, Change "front end" to --frontend--.

In column 10 at line 49-50, Change "front end" to --frontend--.

In column 10 at line 52, Change "front end" to --frontend--.

In the Claims

In column 19 at line 15, In Claim 15, change "comprising;" to --comprising:--.

Signed and Sealed this
Seventeenth Day of September, 2013

Teresa Stanek Rea
*Deputy Director of the United States Patent and Trademark Office*